United States Patent
Pollard et al.

(10) Patent No.: US 12,422,091 B2
(45) Date of Patent: Sep. 23, 2025

(54) BEAM ANCHOR AND METHOD OF USE

(71) Applicant: The Boeing Company, Arlington, VA (US)

(72) Inventors: Gerald Oren Pollard, Snohomish, WA (US); Alexandru Gheorghe Badger, Stanwood, WA (US)

(73) Assignee: The Boeing Company, Arlington, VA (US)

( * ) Notice: Subject to any disclaimer, the term of this patent is extended or adjusted under 35 U.S.C. 154(b) by 456 days.

(21) Appl. No.: 18/167,850

(22) Filed: Feb. 11, 2023

(65) Prior Publication Data
US 2024/0271747 A1    Aug. 15, 2024

(51) Int. Cl.
  *A62B 35/00*    (2006.01)
  *E04G 21/32*    (2006.01)
  *F16M 13/02*    (2006.01)

(52) U.S. Cl.
  CPC ....... *F16M 13/022* (2013.01); *E04G 21/3266* (2013.01)

(58) Field of Classification Search
  CPC .............. F16M 13/022; E04G 21/3266; A62B 35/0068; A62B 35/00
  See application file for complete search history.

(56) References Cited

U.S. PATENT DOCUMENTS

| | | | |
|---|---|---|---|
| 415,689 A | 11/1889 | Williams | |
| 2,765,139 A | 10/1956 | White | |
| 4,062,519 A * | 12/1977 | Jacobs | E04H 3/14 160/331 |
| 4,371,203 A * | 2/1983 | Munro | B66C 1/64 294/103.1 |
| 6,962,234 B1 * | 11/2005 | Reeves | E04G 21/3261 182/36 |
| 10,060,146 B2 * | 8/2018 | Simmons | A62B 35/0068 |
| 2022/0249888 A1 | 8/2022 | Pollard | |

FOREIGN PATENT DOCUMENTS

| | | |
|---|---|---|
| DE | 1096288 | 12/1960 |
| DE | 4334635 | 4/1995 |

OTHER PUBLICATIONS

EPO, Extended European Search Report, Appl. No. EP24154823, issued on Jul. 24, 2024.

* cited by examiner

*Primary Examiner* — Amy J. Sterling

(57) ABSTRACT

A beam anchor includes first and second arm assemblies, each comprising a torque arm having a jaw portion, and a slotted arm having slotted portions containing an arm slot. The jaw portions oppose each other, the slotted portions are side-by-side, and the torque arm and slotted arm of the first and second arm assemblies are coupled to a pair of braces respectively at a pair of pivot joints. The first arm assembly includes a locking mechanism, movable between a locked position locking the torque arm to its slotted arm, and an unlocked position in which the torque arm is freely pivotable. A connector pin extends into the arm slots, and a load on the connector pin causes the slotted arms to pivot away from each other, and the torque arms pivot to toward each other until the jaw portions engage a web of a beam.

20 Claims, 18 Drawing Sheets

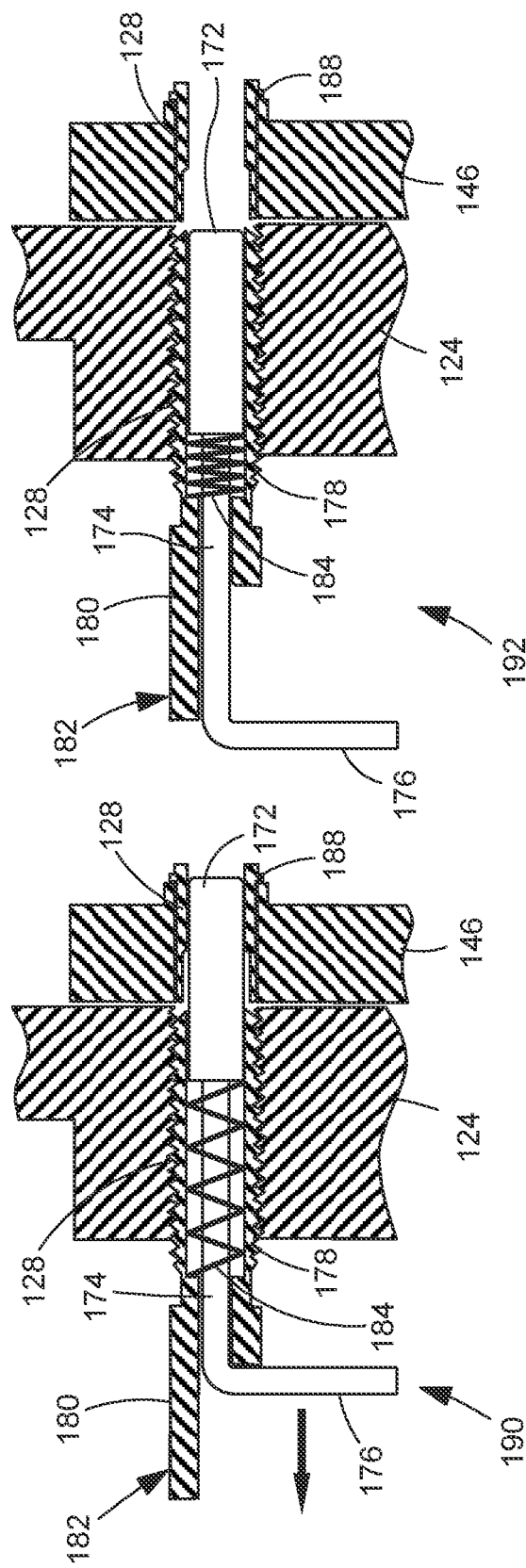

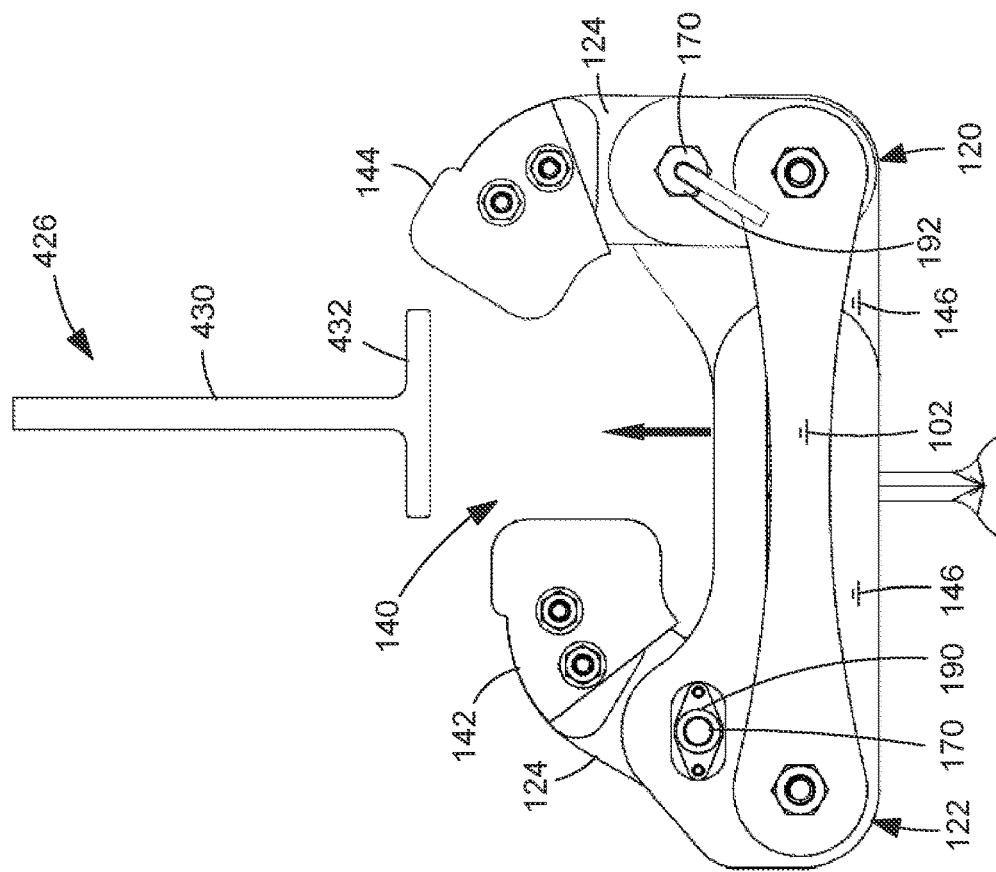
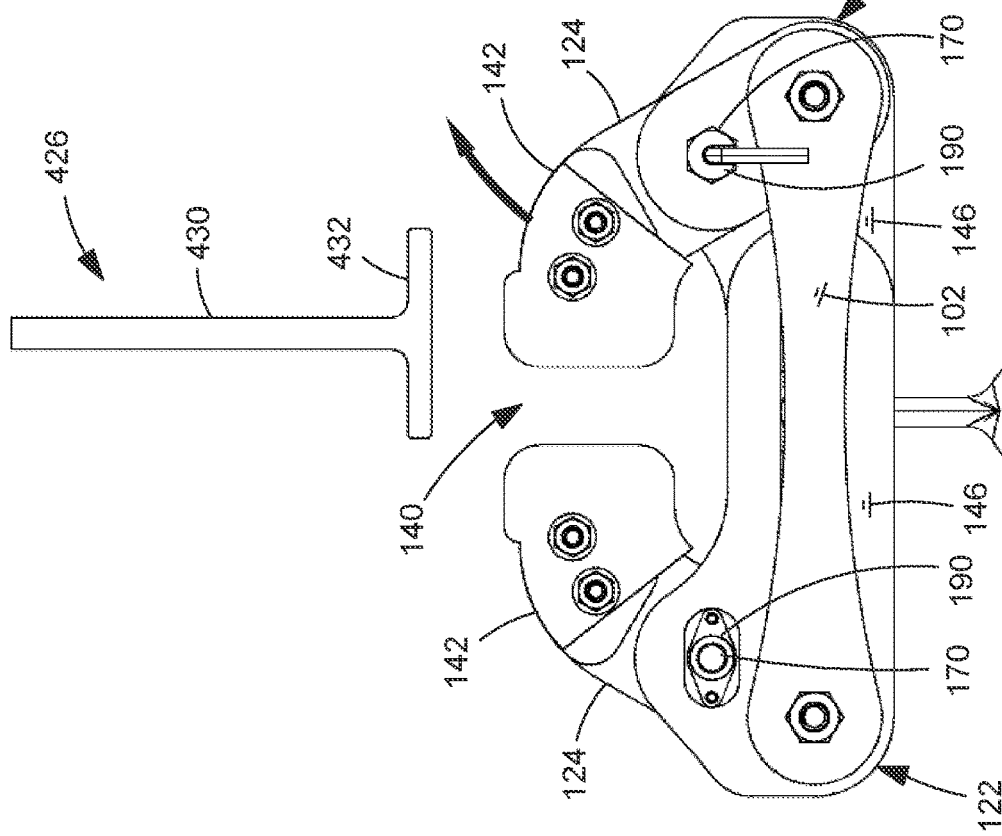

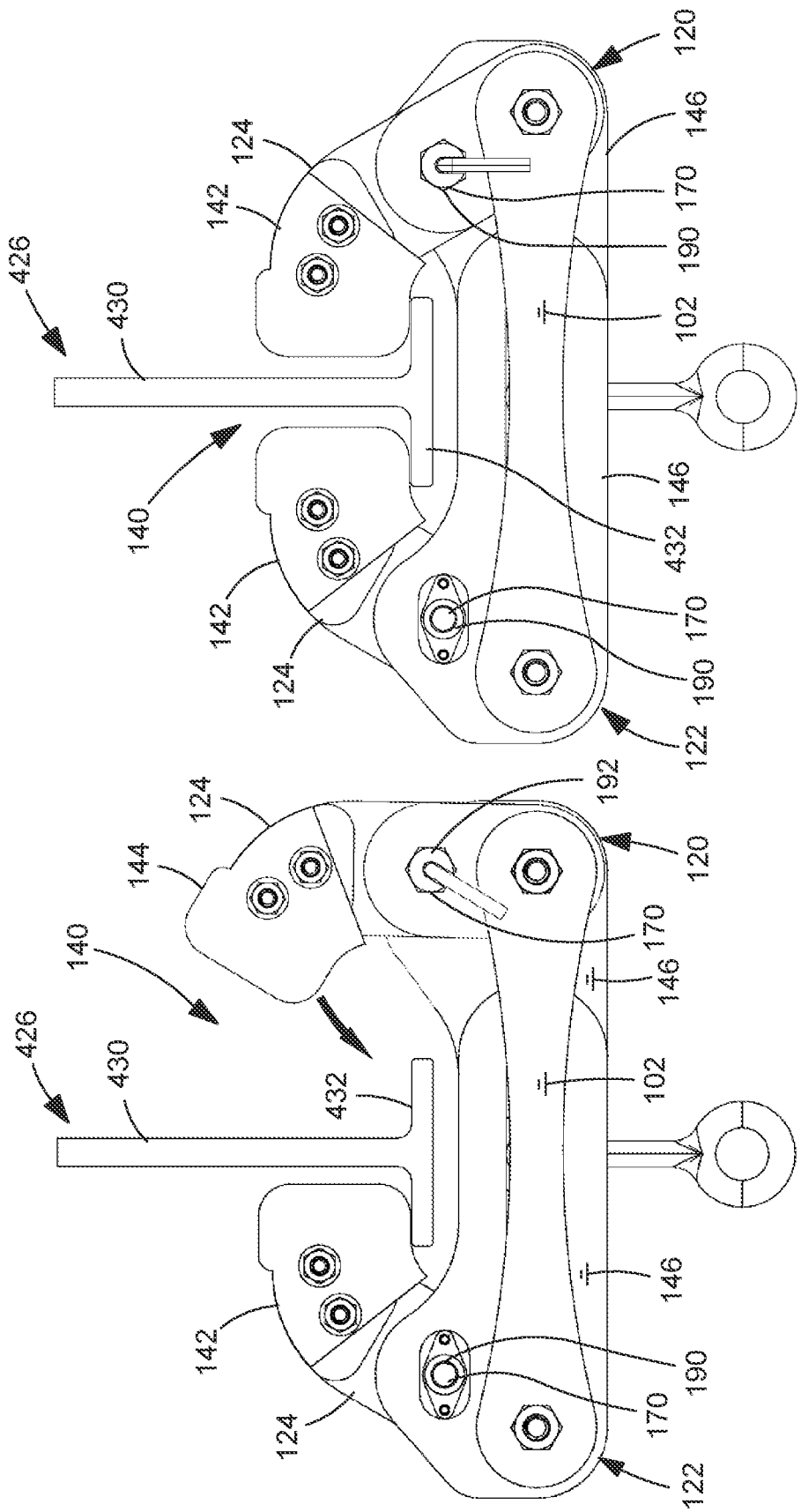

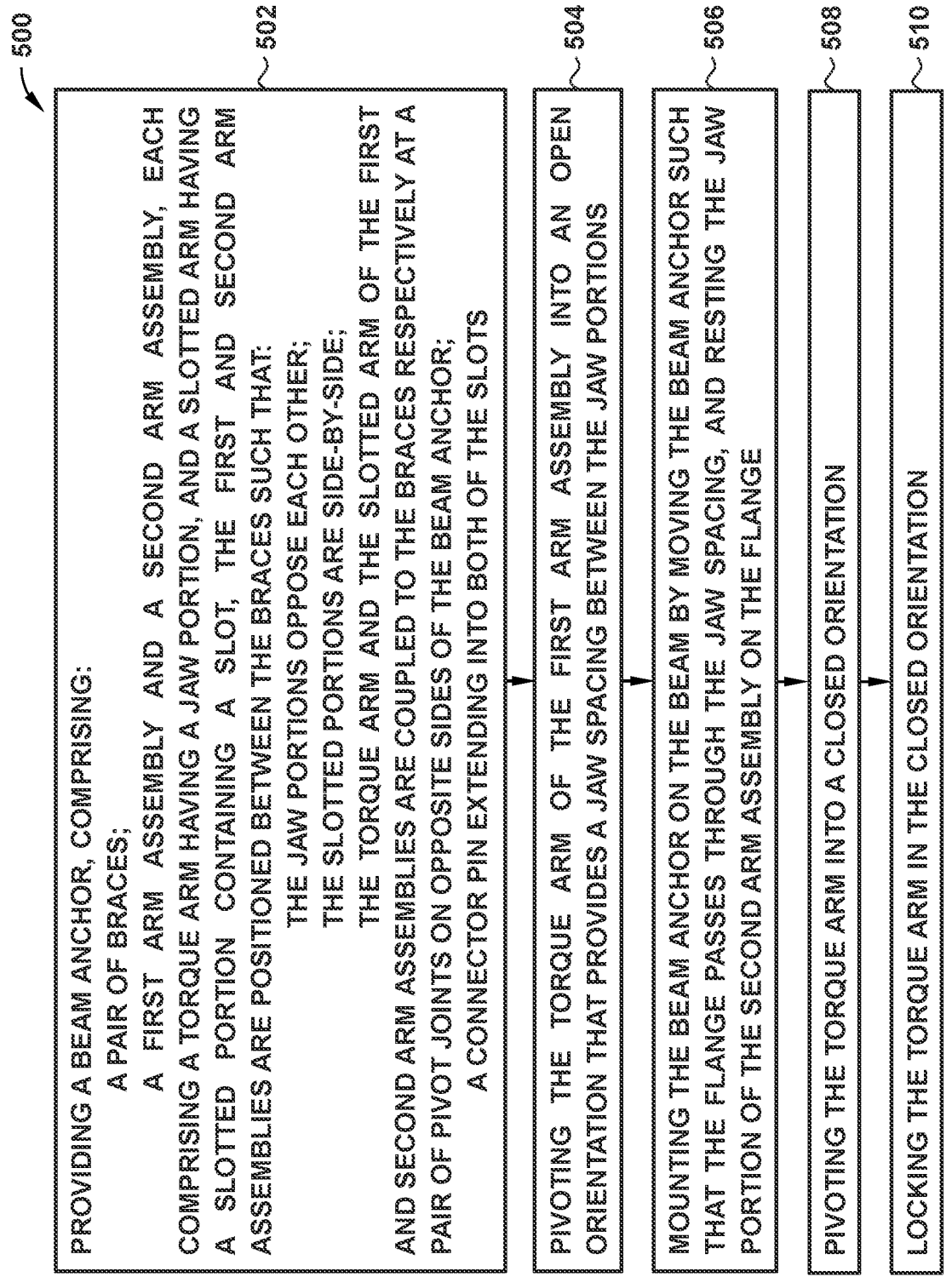

BEAM ANCHOR AND METHOD OF USE

FIELD

The present disclosure relates generally to fall protection systems and, more particularly, to a beam anchor configured to be removably coupled to a beam.

BACKGROUND

Fall protection systems are commonly used in industrial settings to provide protection from falling, including safely arresting the fall of a person. Included among the various types of fall protection systems are beam anchors configured to be secured to an I-beam. Conventional beam anchors require the use of two hands for installation on an I-beam. If the installer is using a ladder to gain access to the I-beam, the installer must let go of the ladder with both hands while installing and removing the conventional beam anchors. Furthermore, the installation of some beam anchors requires the time-consuming process of manually tightening levers or clamps or manipulating hardware in order to secure the beam anchors to the I-beam.

As can be seen, there exists a need in the art for a beam anchor that avoids the above-noted drawbacks associated with conventional beam anchors.

SUMMARY

The above-noted needs associated with conventional fall protection systems are specifically addressed and alleviated by the present disclosure, which provides a beam anchor for mounting on a beam having a web and a flange oriented perpendicular to the web. The beam anchor includes a pair of braces positionable in parallel relation to each other. In addition, the beam anchor includes a first arm assembly and a second arm assembly, each comprising a torque arm having a jaw portion, and a slotted arm having a slotted portion containing an arm slot. The first and second arm assemblies are positionable between the braces such that the jaw portions oppose each other, the slotted portions are side-by-side, and the torque arm and the slotted arm of the first and second arm assemblies are coupled to the braces respectively at a pair of pivot joints on opposite sides of the beam anchor. The beam anchor also includes a locking mechanism, movable between a locked position in which the torque arm of one of the first or second arm assemblies is locked to the slotted arm of the same one of the first or second arm assemblies, and an unlocked position in which the torque arm is freely pivotable relative to the slotted arm. Additionally, the beam anchor includes a connector pin configured to extend into both arm slots. The beam anchor is configured such that when mounted on the beam and with the locking mechanism in the locked position, a load applied to the connector pin causes the slotted arms to pivot away from each other as the connector pin slides along the arm slots, and the torque arms pivot toward each other until the jaw portions engage the web of the beam.

Also disclosed is a fall protection system. The fall protection system includes one or more beam anchors, each configured for clamping onto a beam having a web and a flange perpendicular to the web. Each beam anchor includes a pair of braces, positionable in parallel relation to each other. In addition, each beam anchor includes a pair of arm assemblies, each comprising a torque arm having a jaw portion, and a slotted arm having a slotted portion containing an arm slot, and positionable between the braces such that the jaw portions oppose each other, the slotted portions are side-by-side, and the torque arm and the slotted arm of the pair of arm assemblies are coupled to the braces respectively at a pair of pivot joints on opposite sides of the beam anchor. The beam anchor further includes at least one locking mechanism, movable between a locked position in which the torque arm of one of the arm assemblies is non-pivotably locked to the slotted arm of the same one of the arm assemblies, and an unlocked position in which the torque arm is freely pivotable. Additionally, the beam anchor includes a connector pin, configured to extend into both arm slots. In addition to the plurality of beam anchors, the fall protection system includes a safety net attached to the one or more beam anchors. Each beam anchor is configured such that when mounted on a beam and with the locking mechanism in the locked position, a load on the safety net is transferred to the connector pin, causing the slotted arms to pivot away from each other as the connector pin slides along the arm slots, and causing the torque arms to pivot toward each other until the jaw portions engage the web of the beam.

Also disclosed is a method of installing a beam anchor on a beam. The method includes providing a beam anchor comprising a pair of braces parallel to each other, and a first arm assembly and a second arm assembly, each comprising a torque arm having a jaw portion, and a slotted arm having a slotted portion containing an arm slot. The first and second arm assemblies are positioned between the braces such that the jaw portions oppose each other, the slotted portions are side-by-side, and the torque arm and the slotted arm of the first and second arm assemblies are coupled to the braces respectively at a pair of pivot joints on opposite sides of the beam anchor. Additionally, the beam anchor includes a connector pin extending into both arm slots. The method includes pivoting the torque arm of the first arm assembly into an open position that provides a jaw gap between the jaw portions that is at least as wide as the flange of the beam. In addition, the method includes mounting the beam anchor on the beam by moving the beam anchor such that the flange passes through the jaw gap, and resting the jaw portion of the second arm assembly on the flange. In addition, the method includes pivoting the torque arm of the first arm assembly into a closed position that provides a jaw gap that is narrower that the flange of the beam. Furthermore, the method includes locking the torque arm of the first arm assembly in the closed position.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a cross-sectional view of the beam anchor taken along line 4-4 of FIG. 5, and illustrating an example of a locking mechanism in a locked position for locking the torque arm to the slotted arm of one of the arm assemblies;

FIG. 5 is a cross-sectional view of the locking mechanism of FIG. 4 moved to an unlocked position allowing the torque arm to freely pivot relative to the slotted arm;

FIG. 11 is a front view of the beam anchor, and a cross-sectional view of a beam upon which the beam anchor is to be installed;

FIG. 12 shows one of the torque arms of the beam anchor pivoted into an open position to provide a jaw gap allowing the installation of the beam anchor onto the beam;

FIG. 13 shows the beam anchor mounted on the beam after moving the beam anchor outwardly until the beam flange passes through the jaw gap;

FIG. 14 shows the torque arm pivoted into a closed position and locked in position to thereby secure the beam anchor onto the beam;

FIG. 22 is a flowchart of operations included in a method of installing a beam anchor on a beam.

DETAILED DESCRIPTION

Disclosed examples or versions will now be described more fully hereinafter with reference to the accompanying drawings, in which some, but not all of the disclosed examples or versions are shown. Indeed, several different examples or versions may be provided, and should not be construed as limited to the examples or versions set forth herein. Rather, these examples or versions are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 17:
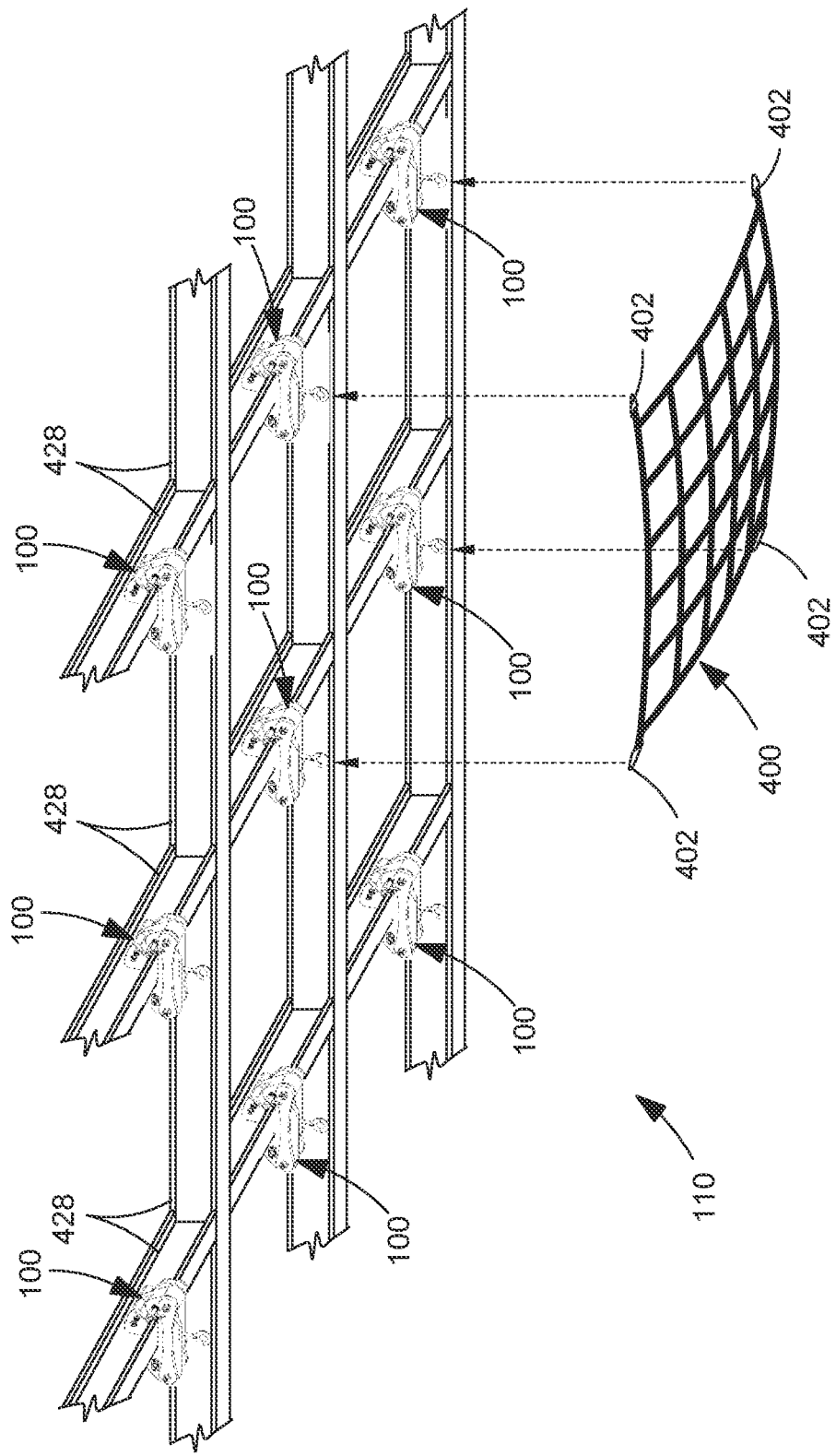
FIG. 17 is a bottom-up perspective view of a floor beam network showing a plurality of the anchors mounted to the beams.
Figure 18:
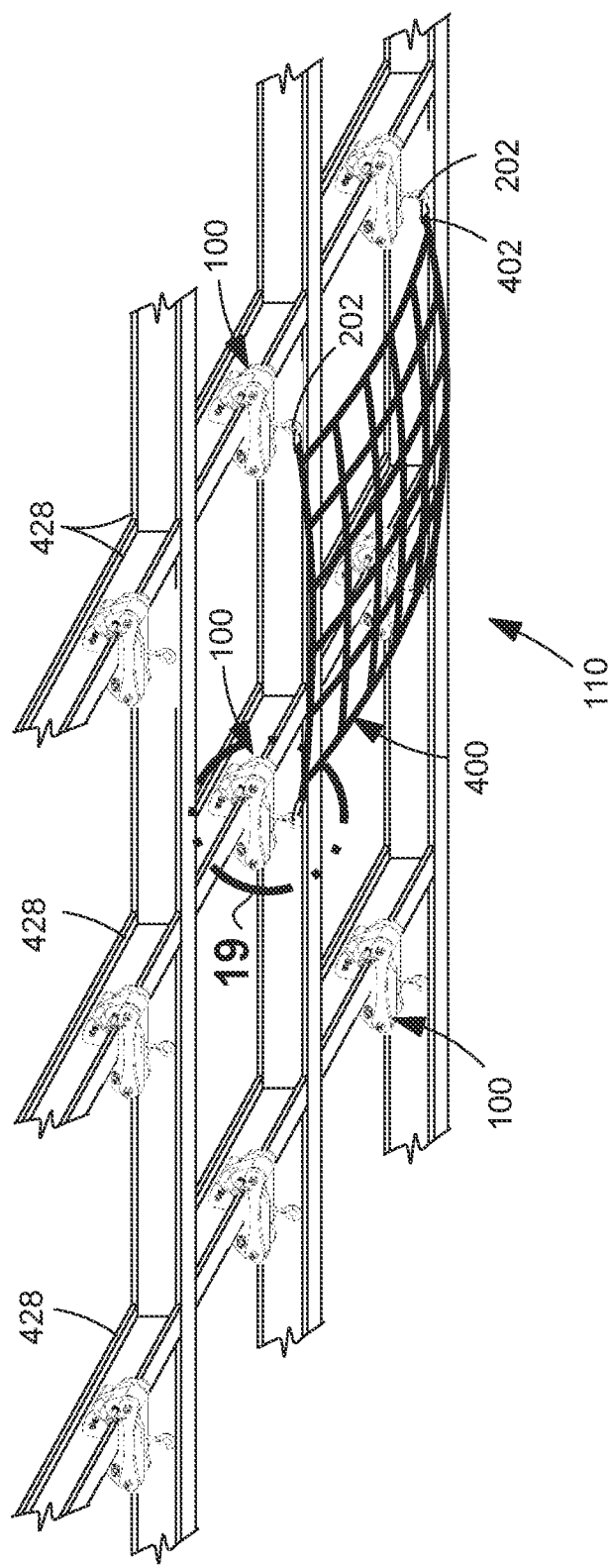
FIG. 18 shows a safety net secured to the beam anchors of FIG. 17.
Figure 19:
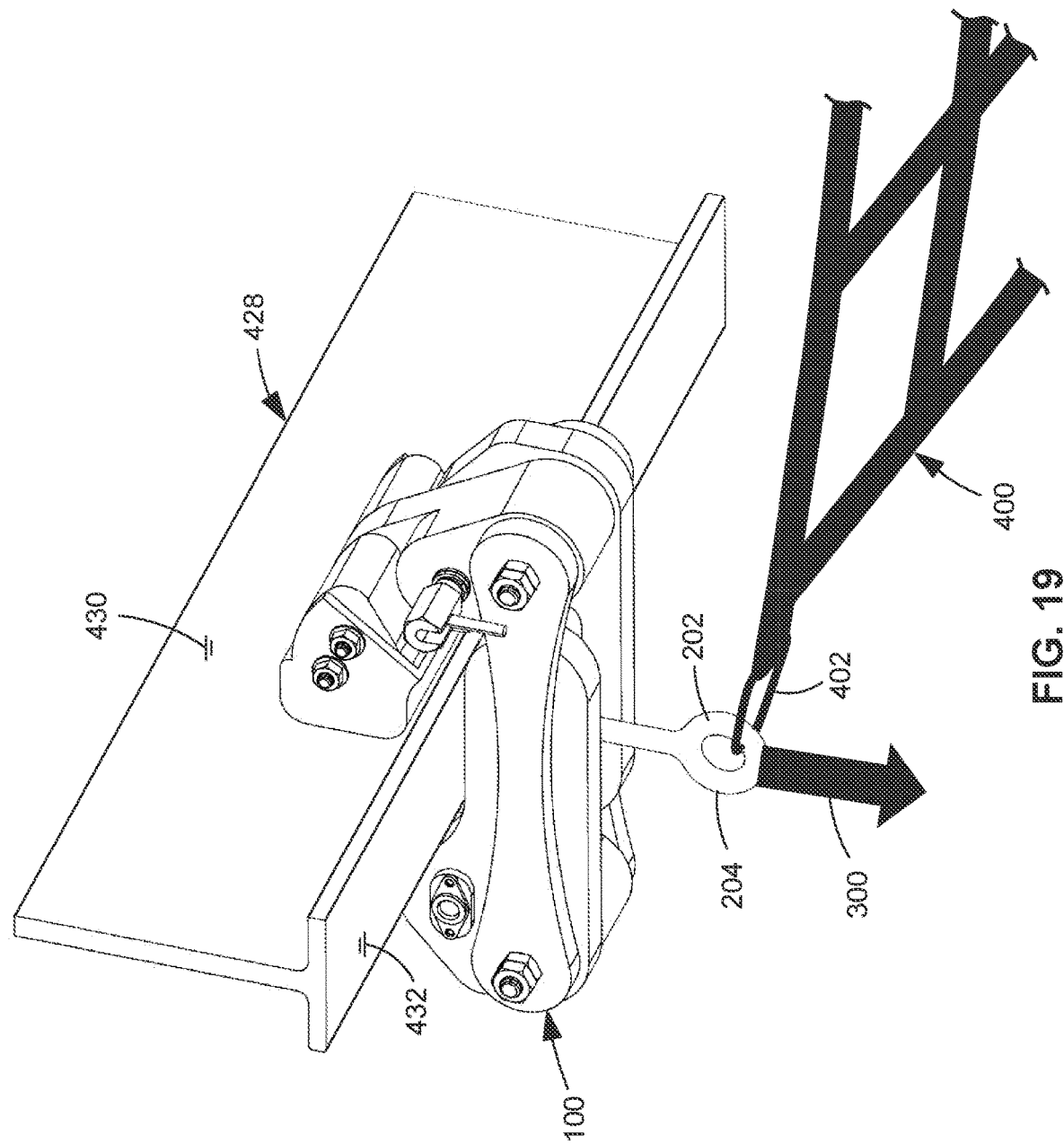
FIG. 19 is a magnified view of the portion of the safety net installation identified by reference numeral 19 of FIG. 18.

Referring to FIGS. 1-7, shown is an example of a beam anchor 100 configured to be removably coupled to a beam 426 (FIG. 11) having a web 430 (FIG. 11) and at least one flange 432. The beam anchor 100 can be part of a fall protection system 110 (FIGS. 18-20) configured to provide protection from fall hazards, including safely arresting the fall of a person. In one example, a plurality of the beam anchors 100 can be coupled to an arrangement of beams 426 (FIG. 9), and any one of a variety of different types of fall protection devices can be secured to the beam anchors 100, such as safety harnesses (not shown), or safety nets 400 as shown in FIGS. 17-19 and described below. Advantageously, the beam anchor 100 is capable of being installed on a beam 426 using only one hand. In addition, the beam anchor 100 does not require the tightening or manipulating of levers, clamps, or other hardware in order to secure the beam anchor 100 to a beam 426.

As mentioned above, the beam anchor 100 can be installed on a beam 426 having a vertical web 430 and at least one horizontal flange 432. In the example of FIGS. 9-16 described below, the beam anchor 100 is removably installed on an I-beam. The I-beam has an I-shaped cross section having upper and lower horizontal flanges 432 interconnected by a vertical web 430. The vertical web 430 is centered on the upper and lower horizontal flanges 432. In another example, the beam anchor 100 can be installed on a beam 426 having a T-shaped cross section having a single lower horizontal flange 432 and a vertical web 430. The beam anchor 100 can be sized for mounting on beams 426 of any size. For example, the beam anchor 100 can be sized for mounting on a beam 426 having a flange 432 width of up to several inches or more, and/or on a beam 426 in which the vertical web 430 has a thickness of up to 1 inch or more.

As shown in FIGS. 1-3 and 6-7, the beam anchor 100 includes a pair of braces 102 arranged in spaced and parallel relation to each other. Each brace 102 has opposing brace ends 104. The beam anchor 100 additionally includes a first arm assembly 120 and a second arm assembly 122. Each of the first and second arm assemblies 120, 122 includes a torque arm 124 and a slotted arm 146. Each torque arm 124 has a jaw portion 130 and a torque arm pivot end 126. Each slotted arm 146 has a slotted arm pivot end 148 and a slotted portion 152 containing an arm slot 154 extending in a lengthwise direction of the slotted portion 152.

The torque arm 124 and the slotted arm 146 of the first and second arm assemblies 120, 122 are positionable in side-by-side and parallel relation to each other between the pair of braces 102. In addition, the torque arm 124 and the slotted arm 146 of the first and second arm assemblies 120, 122 are coupled to the braces 102 respectively at a pair of pivot joints 160 respectively on first and second sides 106, 108 (i.e., opposite sides) of the beam anchor 100. More specifically, the torque arm pivot end 126 of the torque arm 124 and the slotted arm pivot end 148 of the slotted arm 146 of the first arm assembly 120 are pivotally coupled to the brace ends 104 of the pair of braces 102 at the pivot joint 160 on the first side 106 of the beam anchor 100. Similarly, the torque arm pivot end 126 of the torque arm 124 and the slotted arm pivot end 148 of the slotted arm 146 of the second arm assembly 122 are pivotally coupled to the brace ends 104 at the pivot joint 160 on the second side 108 of the beam anchor 100.

In the example beam anchor 100 of FIGS. 1-7, the pivot joint 160 on each of the first and second sides 106, 108 of the beam anchor 100 includes a pivot pin 158 coupling the slotted arm pivot end 148 and the torque arm pivot end 126 to the brace ends 104 at the pivot joint 160. In the example shown, each pivot pin 158 is a mechanical fastener 164 in the form of a bolt 166 secured on its end by one or more nuts 168. However, the pivot pins 158 may be provided in any one of a variety of alternative configurations, and are not limited to bolts 166. Further in this regard, the slotted arm 146, the torque arm 124, and the brace 102 on each of the first and second sides 106, 108 of the beam anchor 100 can be pivotably coupled in any manner, and are not limited to being pivotably coupled by pivot pins 158.

Figure 7:
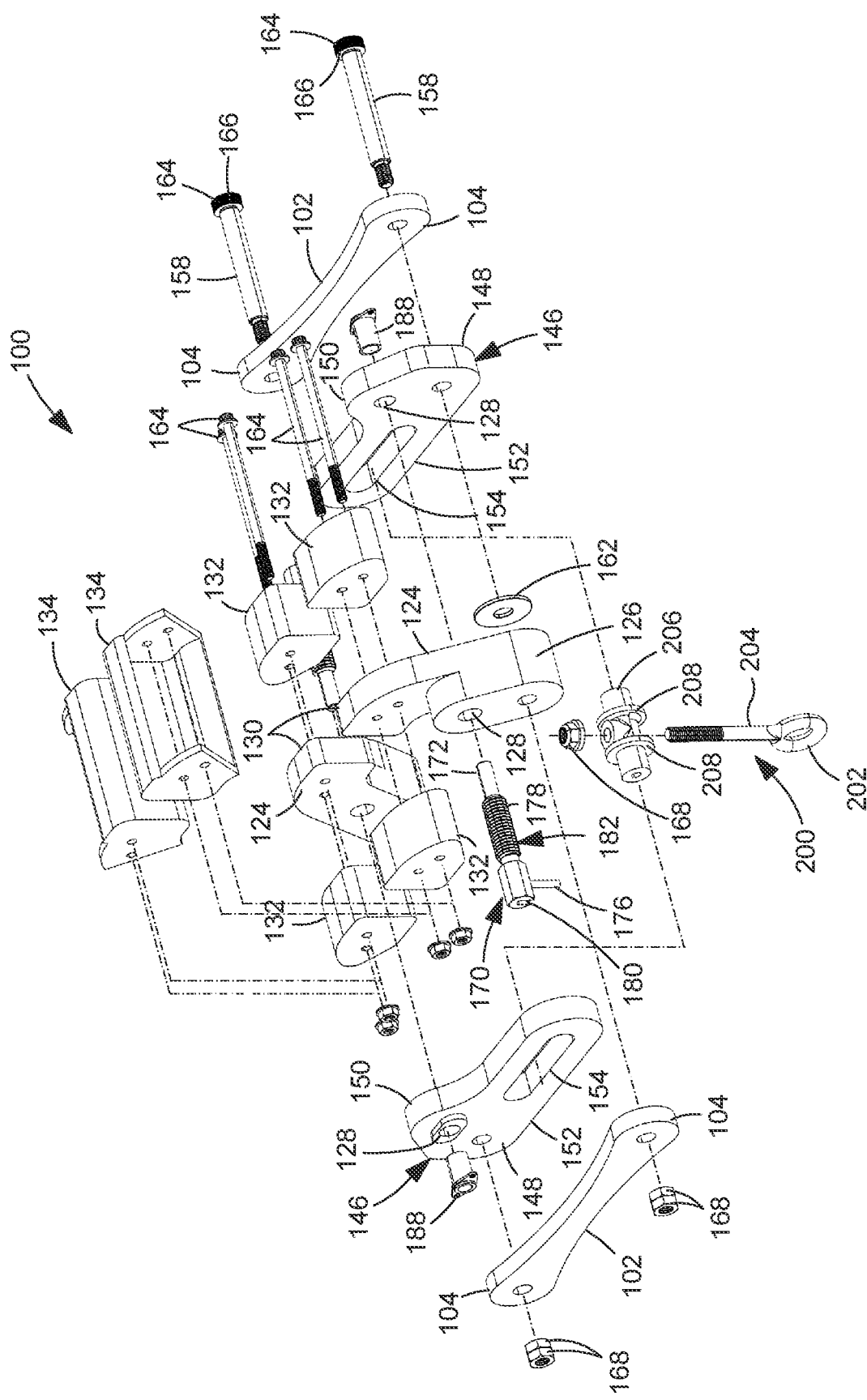
FIG. 7 is an exploded view of the beam anchor.

The torque arm 124 and the slotted arm 146 of each of the first and second arm assemblies 120, 122 can be slightly spaced apart (e.g., 0.050 inch or more) from each other via a spacer 162 (e.g., a plastic or Nylon™ washer) at the pivot joints 160, as shown in FIG. 7. Alternatively, the torque arm 124 and the slotted arm 146 of each of the first and second arm assemblies 120, 122 can be in sliding contact with each other. In still other examples not shown, each pivot joint 160 can include a spacer between the brace 102 and the slotted arm 146, and a spacer between the brace 102 and the torque arm 124.

Figure 1:
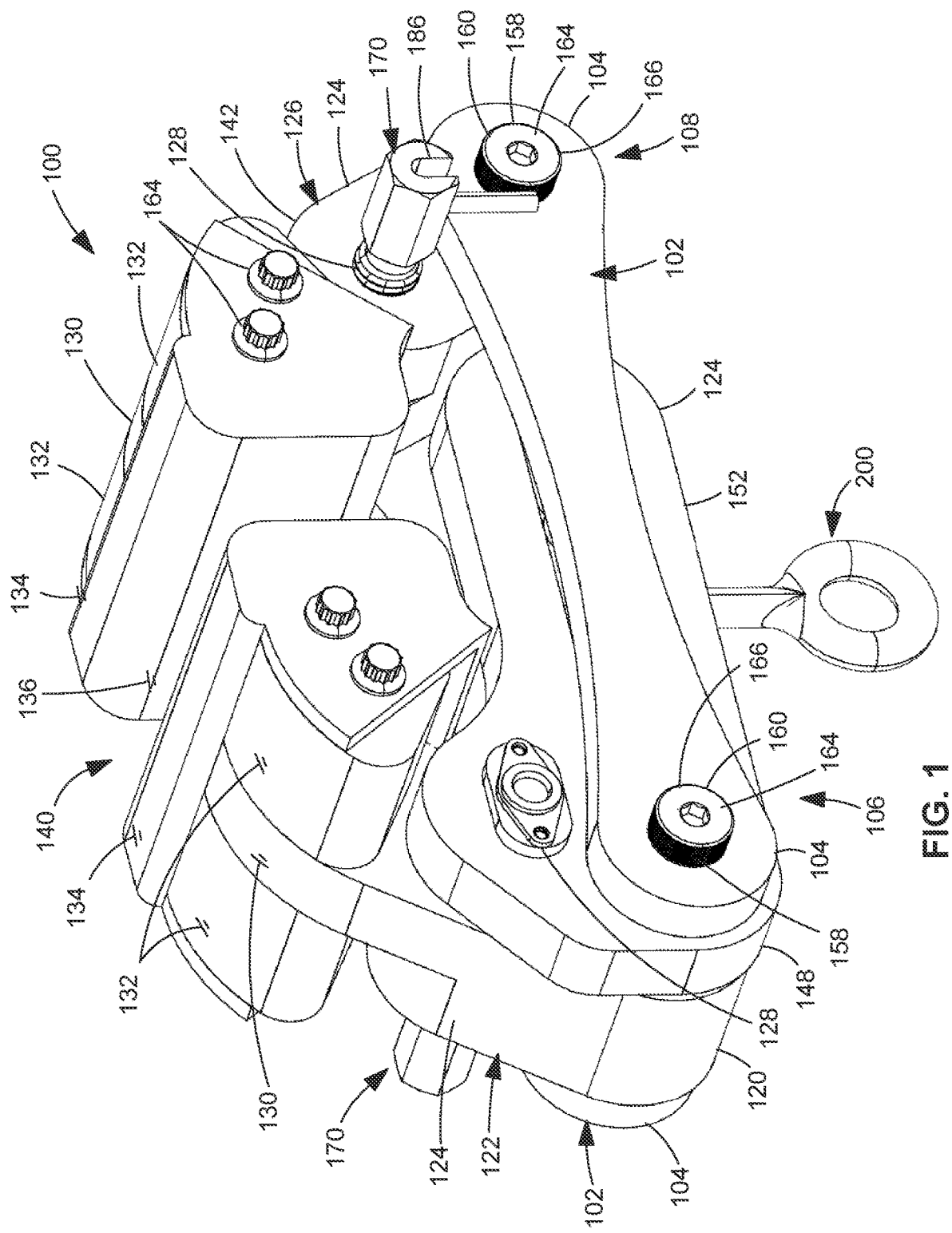
FIG. 1 is a perspective view of an example of a beam anchor, illustrating a pair of arm assemblies located between a pair of braces, and further illustrating a torque arm and a slotted arm of each arm assembly.
Figure 2:
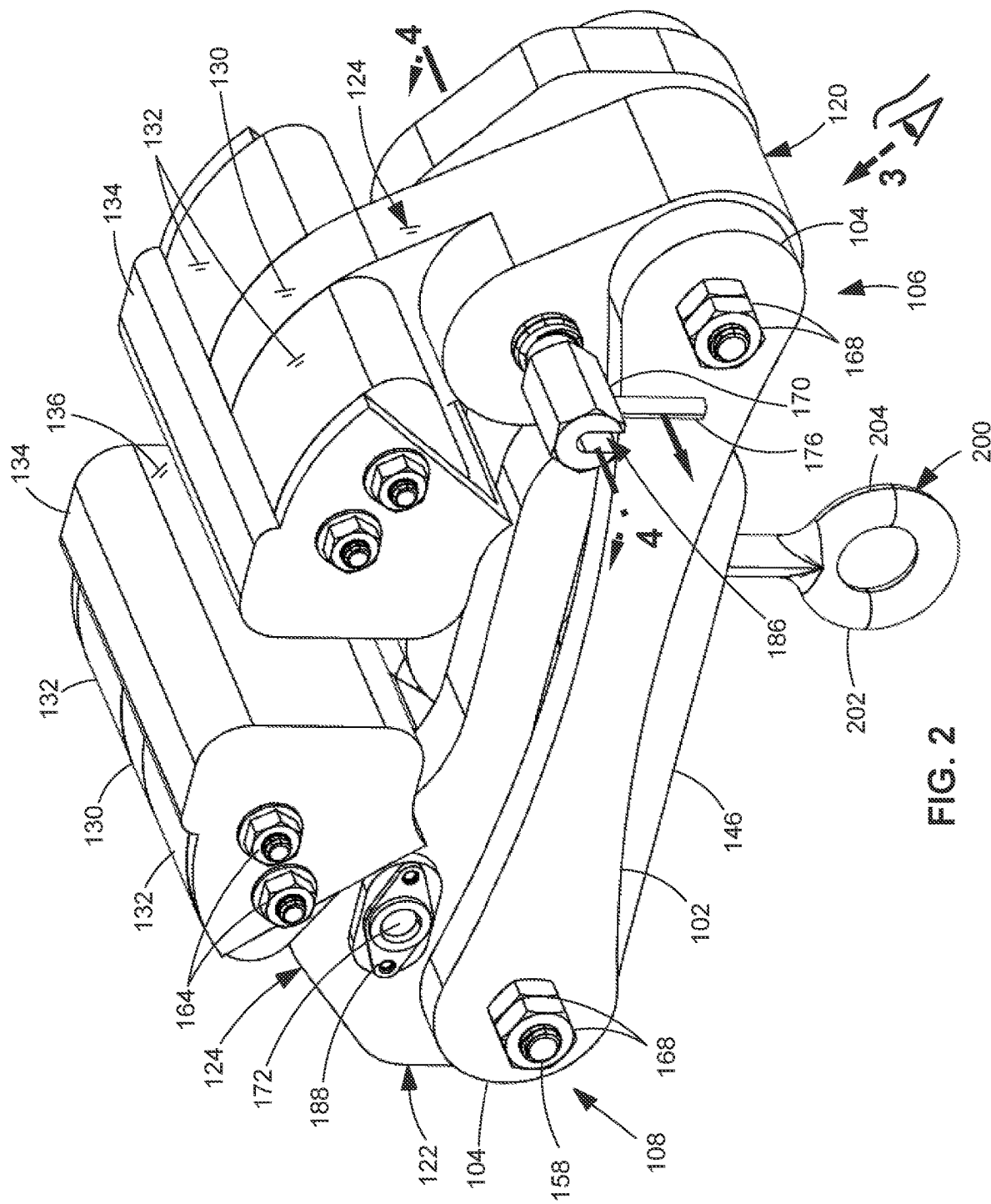
FIG. 2 is a further perspective view of the beam anchor of FIG. 1.
Figure 3:
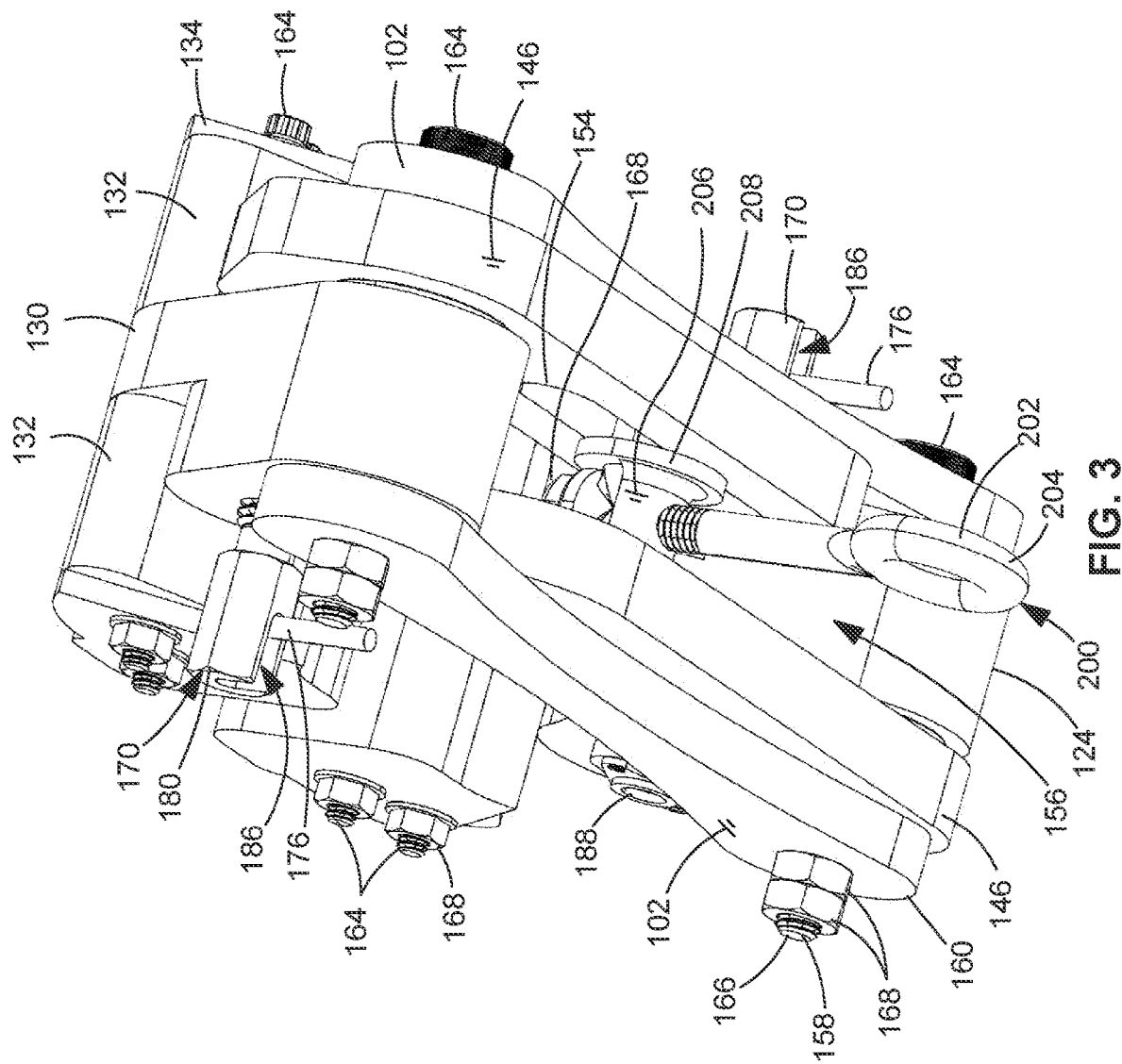
FIG. 3 is a view of the underside of the beam anchor taken along line 3 of FIG. 2 illustrating a loading mechanism having a loading member (e.g., eye bolt) protruding out of a slotted arm gap between the slotted arms of the arm assemblies.

As shown in FIGS. 1-3 and 6, the first and second arm assemblies 120, 122 are positioned between the pair of braces 102 in a manner such that the jaw portions 130 oppose each other, and define a jaw gap 140 between the opposing jaw portions 130. In addition, the first and second arm assemblies 120, 122 are positioned between the pair of braces 102 such that the slotted portions 152 are in side-by-side and overlapping relation with each other, and are spaced apart to define a slotted arm gap 156, as shown in FIG. 3.

In the example of FIGS. 1-7, the first and second arm assemblies 120, 122 each have a dedicated locking mechanism 170 for locking and unlocking the torque arm 124 to the slotted arm 146 of the respective first and second arm assemblies 120, 122. Each locking mechanism 170 is movable between a locked position 190 (FIG. 4) and an unlocked position 192 (FIG. 5). When the locking mechanism 170 of the first or second arm assembly 122 is in the locked position 190, the respective torque arm 124 is locked to the slotted arm 146, thereby preventing the torque arm 124 from pivoting relative to the slotted arm 146. When the torque arm 124 of the first or second arm assembly 122 is locked to the respective slotted arm 146, the torque arm 124 is in a closed position 142. The beam anchor 100 is sized and configured such that when the torque arms 124 of both the first and second arm assemblies 120, 122 are in the closed position 142, the jaw gap 140 (FIGS. 11 and 14) between the jaw portions 130 is narrower than the width of the flange 432 of the beam 426 on which the beam anchor 100 is to be installed. The locking mechanism 170 is typically placed in the locked position 190 after the beam anchor 100 has been installed on a beam 426, as shown in FIG. 14 and described below.

When the locking mechanism 170 of the first or second arm assembly 122 is in the unlocked position 192 (FIGS. 12-13), the respective torque arm 124 is freely pivotable relative to the slotted arm 146. In the unlocked position 192, the respective torque arm 124 can be pivoted into an open position 144 (e.g., FIGS. 12-13) that provides a jaw gap 140 enabling the installation or removal of the beam anchor 100 from the beam 426, as shown in FIGS. 13-14 and described below. More specifically, the beam anchor 100 is sized and configured such that when the torque arm 124 of at least one of the first and second arm assemblies 120, 122 is in the open position 144, the jaw gap 140 between the pair of jaw portions 130 is at least as wide as the flange 432 of the beam 426.

Referring to FIGS. 4-5, in one example of the beam anchor 100, each locking mechanism 170 comprises a locking pin 172 that is axially movable within pin bores 128 in the respective torque arm 124 and slotted arm 146. The locking pin 172 is movable between the locked position 190 and the unlocked position 192. The pin bore 128 in each torque arm 124 is located between the torque arm pivot end 126 and the jaw portion 130. The pin bore 128 in each slotted arm 146 is located in a pin tab 150 protruding from an upper side of the slotted arm 146 near the slotted arm pivot end 148. However, in other examples not shown, the pin tab 150 can be formed at any one of a variety of other locations on the torque arm 124. The locking mechanism 170 of each first and second arm assembly 120, 122 is configured such that when the locking pin 172 is in the locked position 190, the locking pin 172 extends through the pin bores 128 of both the torque arm 124 and the slotted arm 146 in a manner such that the torque arm 124 is locked to the slotted arm 146. When the locking pin 172 is in the unlocked position 192, the locking pin 172 extends through only one of the pin bores 128 (e.g., the pin bore 128 of the torque arm 124), thereby allowing the torque arm 124 to pivot relative to the slotted arm 146.

Referring to FIGS. 4-5, the locking mechanism 170 has a locking pin 172 that is axially slidable within a pin sleeve 182 in the torque arm 124. The pin sleeve 182 has a threaded portion 178 which is threadably installed in the pin bore 128 in the torque arm 124. The pin sleeve 182 also has a hex portion 180 located adjacent to the threaded portion 178 and which protrudes out of the torque arm 124. The hex portion 180 facilitates the installation (e.g., via a wrench) of the threaded portion 178 into the torque arm 124.

The locking mechanism 170 of FIGS. 4-5 includes a pin shaft 174 extending from the locking pin 172. Although not shown, one end of the pin shaft 174 can be threaded, and the locking pin 172 can be threadably engaged to the threaded end of the pin shaft 174. On an opposite end, the pin shaft 174 has a pin handle 176 protruding laterally out of a pin slot 186 formed in the hex portion 180, as shown in FIG. 3. The pin handle 176 is configured to move within the pin slot 186 when the pin handle 176 is manually grasped for moving the locking pin 172 between the locked position 190 and the unlocked position 192. When the locking pin 172 is moved to the locked position 190 as shown in FIG. 4, the free end of the locking pin 172 is received within a pin receptacle 188 affixed to the pin bore 128 in the slotted arm 146. When the locking pin 172 is moved to the unlocked position 192 as shown in FIG. 5, the free end of the locking pin 172 is retracted inside the pin sleeve 182 in the torque arm 124.

In some examples, the locking pin 172 can be biased (e.g., spring-loaded) toward the locked position 190. For example, as shown in FIGS. 4-5, the locking mechanism 170 can include a coil spring 184 captured inside the pin sleeve 182 and surrounding the pin shaft 174. When the locking pin 172 is aligned with the pin bore 128 (e.g., the pin receptacle 188) in the slotted arm 146 and when the clocking of the pin handle 176 matches the clocking of the pin slot 186 in the hex portion 180, the locking pin 172 is urged by the coil spring 184 into the pin bore 128, thereby locking the torque arm 124 to the slotted arm 146. The locking pin 172 can be temporarily fixed in the unlocked position 192 by pulling the pin handle 176 along the pin slot 186 until the pin handle 176 clears the end of the hex portion 180, and then rotating the pin handle 176 out of alignment with the pin slot 186 so that the pin handle 176 bears against the end surface of the hex portion 180. The locking pin 172 can be moved back toward the locked position 190 by rotating the pin handle 176 until aligned with the pin slot 186, after which the coil spring 184 will urge the locking pin 172 into the locked position 190 when the locking pin 172 is aligned with the pin bore 128 in the slotted arm 146.

Although the present example of the beam anchor 100 includes a dedicated locking mechanism 170 for each of the first and second arm assemblies 120, 122, in an alternative example not shown, only the first arm assembly 120 includes a locking mechanism 170 that allows its torque arm 124 to pivot into an open position 144 allowing for installation and removal of the beam anchor 100 on a beam 426. In such an alternative example, the second arm assembly 122 is devoid of a locking mechanism 170, and the torque arm 124 and the slotted arm 146 of the second arm assembly 122 can be fixedly coupled to each other.

Figure 6:
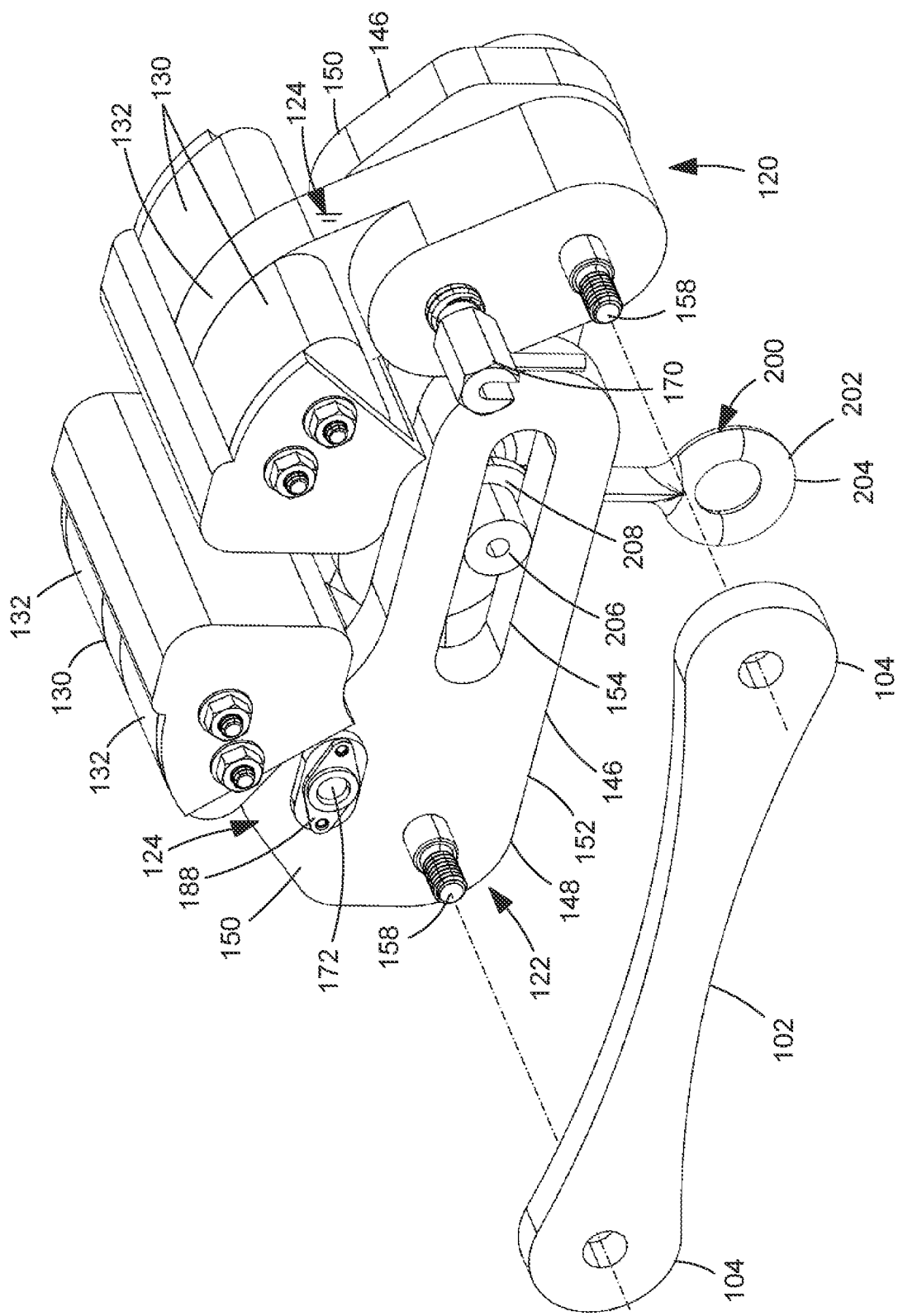
FIG. 6 is a partially exploded view of the beam anchor of FIGS. 1-5 in which one of the braces is separated away to illustrate one of the slotted arms.

Referring to FIGS. 1-3 and 6-7, the beam anchor 100 includes a loading mechanism 200 for loading the beam anchor 100 when mounted to a beam 426. The loading mechanism 200 includes a connector pin 206 (FIGS. 5 and seven) that extends across the slotted arm gap 156 and into both arm slots 154 of the slotted arms 146, as shown in FIGS. 3 and 6. The loading mechanism 200 includes a loading member 202 coupled to the connector pin 206 and extending out of the slotted arm gap 156 (FIG. 3). The connector pin 206 has shoulders 208 on opposite sides of the loading member 202 to restrict axial motion of the connector pin 206. The connector pin 206 is centered within the beam anchor 100 to ensure that loads are centered on the beam 426.

The loading member 202 can be provide as a shaft-like member extending perpendicularly from the connector pin 206, such as the eye bolt 204 (i.e., a closed-ring hook bolt) shown in the figures. In the example shown, the eye bolt 204 has a threaded portion 178 that extends through the connector pin 206, and is secured via a lock nut 168. However, in an alternative configuration, the loading member 202 (e.g., the eye bolt 204) and the connector pin 206 can be a unitary structure (e.g., welded together).

Figure 21:
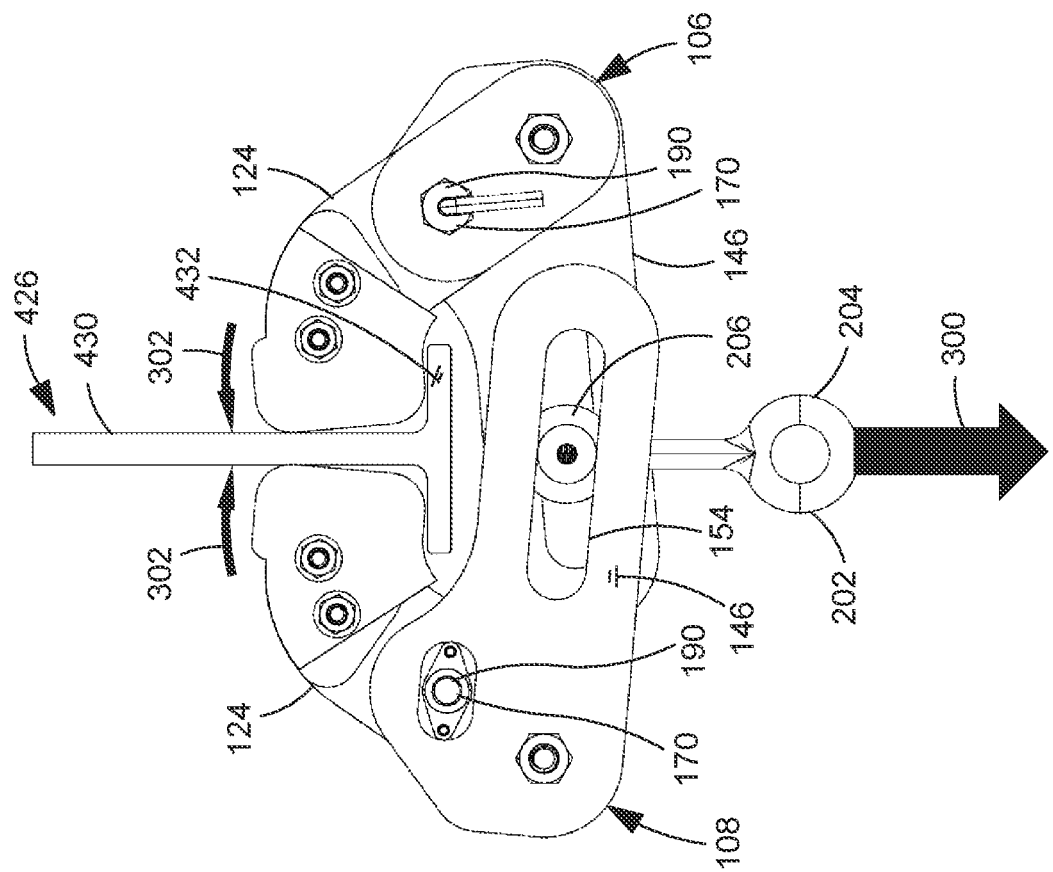
FIG. 21 illustrates the application of a tensile load to the connector pin, causing the slotted arms to pivot away from each other, and the jaw portions to clamp onto the web of the beam.
Figure 20:
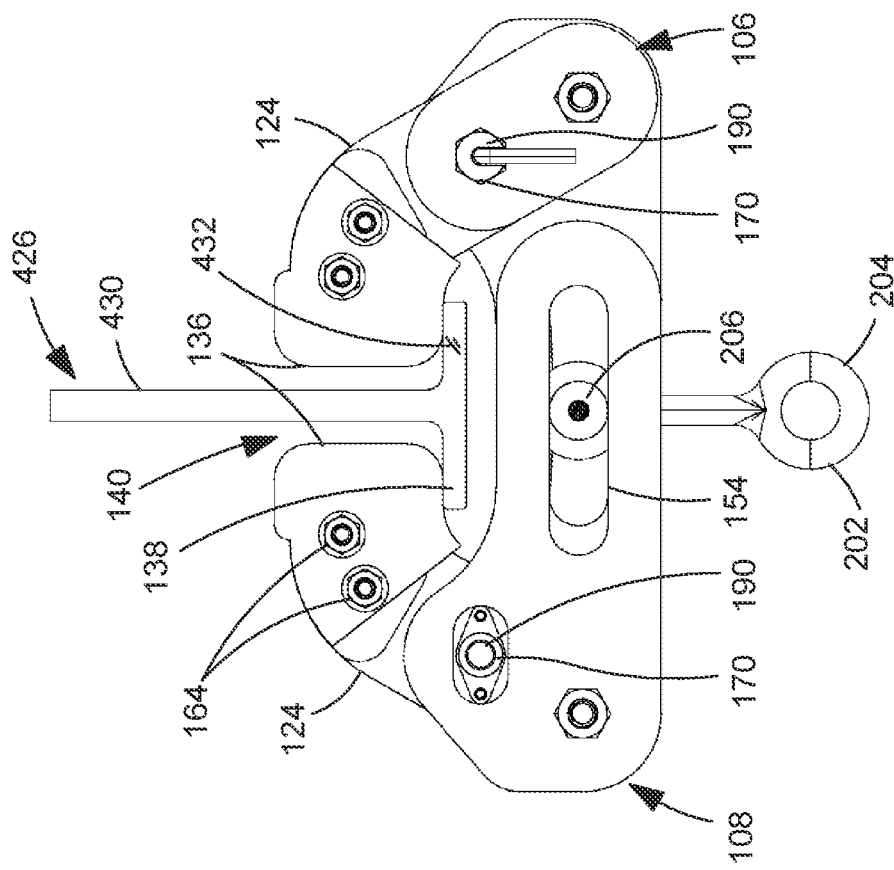
FIG. 20 is a front view of the beam anchor installed on a beam, with one of the braces removed to illustrate a connector pin extending into each of the arm slots respectively formed in the slotted arms.

As shown in FIGS. 20-21, the beam anchor 100 is configured such that when mounted on a beam 426 with the locking mechanisms 170 in the locked position 190, a load 300 on the connector pin 206 causes the slotted arms 146 to pivot away from each other, and the torque arms 124 to pivot toward each other. More specifically, the load 300 on the connector pin 206 is the result of a tensile load (e.g., a downward load) on the loading member 202 (e.g., the eye bolt 204). The connector pin 206 transfers the tensile load to the slotted arms 146, causing the connector pin 206 to urge the slotted arms 146 to pivot away from each other about the pivot pins 158 respectively on the first and second sides 106, 108 as the connector pin 206 slides along the arm slots 154. Simultaneously, the torque arms 124 pivot toward each other, causing the jaw portions 130 to engage the web 430 of the beam 426. In this regard, the jaw portions 130 apply a clamping force 302 to the web 430 as shown in FIG. 21. The clamping force 302 locks the beam anchor 100 to the beam 426, and prevents movement of the beam anchor 100 relative to the beam 426.

The load 300 on the loading member 202 can be caused by the weight of equipment (e.g., tools, materials, etc.) or a person falling on a safety harness (not shown) or a safety net 400 that is attached to beam anchors 100 that are mounted to beams 426 (e.g., FIGS. 17-18). For example, a plurality of beam anchors 100 can be mounted to floor beams 428 of a barrel section 424 of an aircraft 420 (FIGS. 8-9) in preparation for the manual placement of floorboards 434 on the floor beams 428, as shown in FIGS. 8-16 and described below. Following the mounting of the beam anchors 100 to the floor beams 428, safety nets 400 can be attached to the beam anchors 100, as shown in FIG. 17-19 and described below. An example safety net 400 can be comprised of elastic webbing arranged in a cross pattern. The safety net 400 can attached to the loading members 202 (e.g., eye bolts 204) of the beam anchors 100 using attachment clips 402, such as locking D-ring carabiners, or other attachment devices.

Referring to the example of FIGS. 1-3 and 6-7, the beam anchor 100 includes a pair of jaw blocks 132 on opposite sides of the jaw portion 130 of the torque arm 124 of each of the first and second arm assemblies 120, 122. The jaw blocks 132 are configured to distribute forces on the beam 426. For example, the jaw blocks 132 are configured to distribute forces on the web 430 when the jaw portions 130 engage the web 430, and apply a clamping force 302 (FIG. 21) on the web 430. In the example shown, the jaw blocks 132 are attached to opposite sides of the jaw portion 130 using mechanical fasteners 164. In another example not shown, the jaw blocks 132 of each torque arm 124 can be integral with the jaw portion 130.

In FIGS. 1-3 and 6-7, the beam anchor 100 further includes a jaw pad 134 covering the jaw portion 130 and the jaw blocks 132 on each of the first and second arm assemblies 120, 122. In the example shown, each jaw pad 134 has a web-bearing face 136 (FIG. 20) and a flange-bearing face 138 (FIG. 20) configured to respectively bear against a vertically oriented web 430 and a horizontally oriented flange 432 of the beam 426. The jaw pads 134 can be mechanically coupled to the jaw blocks 132 and jaw portion 130 using the above-described mechanical fasteners 164 (FIG. 20). Each jaw pad 134 can be formed of a material that is softer than the material of the beam 426 to which the beam anchor 100 is to be mounted. The jaw pads 134 are configured to protect the beam 426 from scratching, indentations, dents, scrapes, and other types of damage. In one example, the jaw pads 134 can be formed of impact resistant polyurethane, although the jaw pads 134 can be formed of any one of a variety of materials.

The hardware of the beam anchor 100 is preferably formed of metallic material, such as steel. For example, the locking mechanism 170 including the locking pins 172, the pin sleeves 182, the pin handles 176, the pin receptacles 188, the pivot pins 158, and the loading mechanism 200 (e.g., the connector pin 206 and the eye bolt 204) can be formed of metallic material. However, any one or more of the above-described hardware components can be formed of high-strength polymeric material.

Any one or more of the non-hardware components of the beam anchor 100 are preferably formed of a non-metallic material, such as polymeric material. For example, the braces 102, the torque arms 124 and slotted arms 146 of the first and second arm assemblies 120, 122, the jaw blocks 132, and the jaw pads 134 can be formed of a thermoplastic material, such as carbon fiber polyether ether ketone (PEEK). The above-mentioned components can be formed using additive manufacturing (e.g., 3D printing), injection molding, or other suitable manufacturing techniques. Advantageously, carbon fiber PEEK has favorable mechanical properties at elevated temperatures including low mass (i.e., lightweight), excellent chemical resistance, a low coefficient of thermal expansion, and low moisture absorption. Although PEEK is a preferred material for forming the above-mentioned components, any suitable metallic and/or non-metallic material can be used. Advantageously, the first and second arm assemblies 120, 122 of the above-described beam anchor 100 are identical in size, shape, and material, as are the braces 102, which can reduce manufacturing costs.

Figure 8:
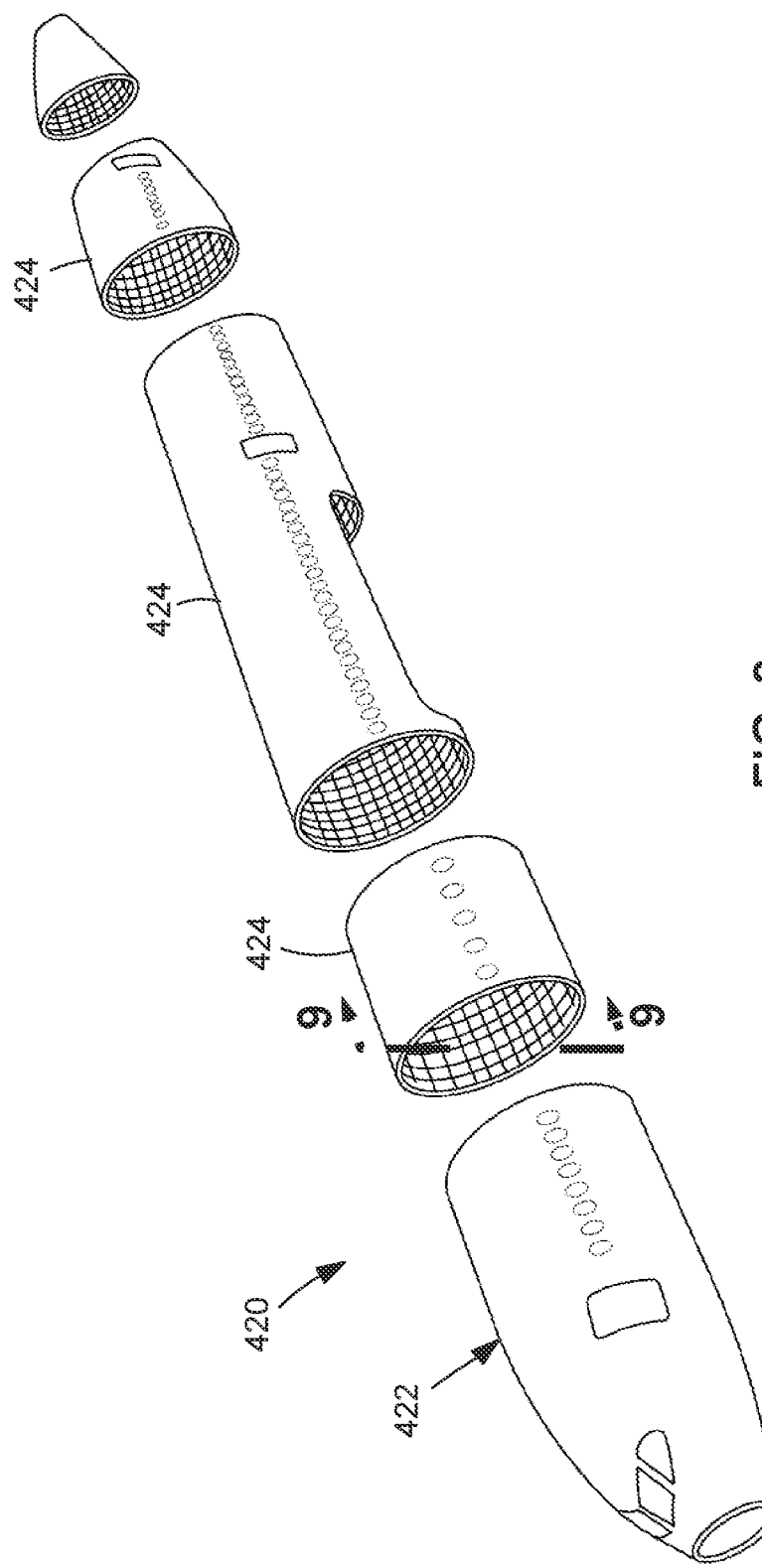
FIG. 8 is an exploded view of an aircraft fuselage comprising a series of barrel sections.
Figure 9:
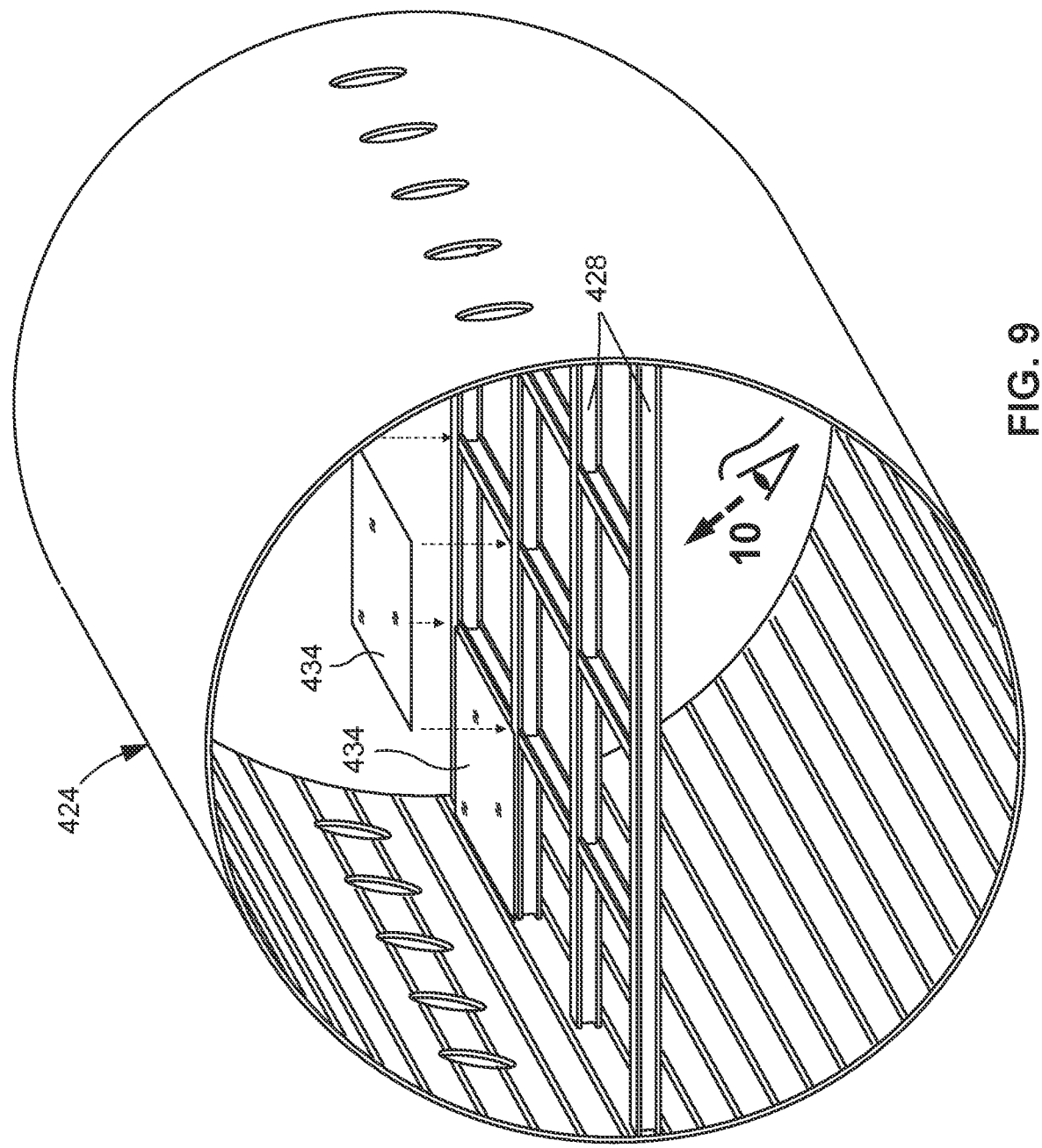
FIG. 9 is a perspective view of one of the barrel sections of FIG. 8, illustrating a network of floor beams for supporting a plurality of floorboards.
Figure 10:
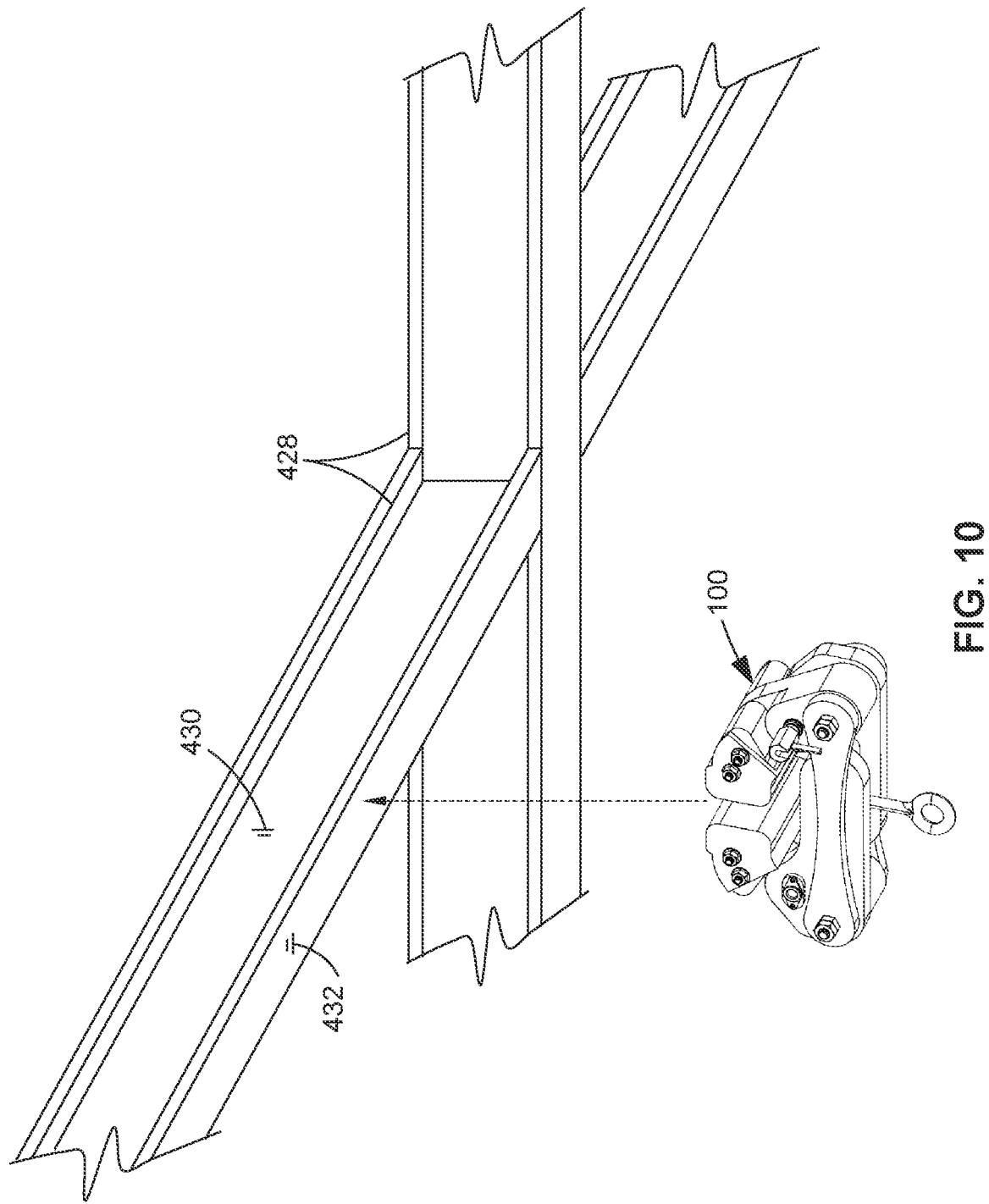
FIG. 10 is a view of the underside of the floor beams taken along line 10 of FIG. 9.

Referring to FIG. 22, shown is a flowchart of operations included in a method 500 of installing a beam anchor 100 on a beam 426. The method 500 is described in the context of installing a beam anchor 100 on a floor beam 428 of a barrel section 424 of an aircraft 420 fuselage 422, as shown in FIGS. 8-9. As described above, the beam 426 has a web 430 and at least one flange 432 oriented perpendicular to the web 430, as shown in FIG. 10.

Step 502 of the method 500 includes providing a beam anchor 100, an example of which is shown in FIGS. 1-9 and described above. As noted above, the beam anchor 100 comprises a pair of braces 102, and first and second arm assemblies 120, 122, each of which comprises a torque arm 124 having a jaw portion 130, and a slotted arm 146 having a slotted portion 152 containing an arm slot 154. The first and second arm assemblies 120, 122 are positioned between the braces 102 such that the jaw portions 130 oppose each other, the slotted portions 152 are side-by-side, and the torque arm 124 and the slotted arm 146 of the first and second arm assemblies 120, 122 are coupled to the braces 102 respectively at a pair of pivot joints 160 respectively on the first and second sides 106, 108 of the beam anchor 100. The beam anchor 100 also includes a connector pin 206 which extends across the slotted arm gap 156 and into both arm slots 154, and a loading member 202 (e.g., eye bolt 204) is coupled to the connector pin 206 for loading the beam anchor 100 as described below.

Referring to FIGS. 11-12, step 504 of the method 500 includes pivoting the torque arm 124 of the first arm assembly 120 into an open position 144 that provides a jaw gap 140 between the jaw portions 130 that is at least as wide as the flange 432 of the beam 426. Prior to pivoting the torque arm 124, the locking mechanism 170 of the first arm assembly 120 is moved to the unlocked position 192 (e.g., FIG. 5) to allow the torque arm 124 to pivot. In the above-described example of FIGS. 4-5 in which the locking mechanism 170 includes a coil spring 184, the method includes placing the locking mechanism 170 in the unlocked position 192 by manually pulling the pin handle 176 along the pin slot 186 until the pin handle 176 clears the end of the hex portion 180, and then rotating the pin handle 176 out of alignment with the pin slot 186 so that the pin handle 176 is held against the end surface of the hex portion 180 under the biasing force of the coil spring 184. As shown in FIGS. 11-12, the locking mechanism 170 of the second arm assembly 122 is already in the locked position 190 (e.g., FIG. 4), thereby maintaining the torque arm 124 of the second arm assembly 122 in the closed position 142.

Step 506 of the method 500 includes mounting the beam anchor 100 on the beam 426. In the context of FIGS. 12-13, step 506 comprises mounting the beam anchor 100 to one of the floor beams 428 of the barrel section 424. Beam anchors can be mounted to an aircraft 420 at any time, including when the aircraft 420 is under construction, or when the aircraft 420 is undergoing maintenance, refurbishment, or repair. Step 506 of the mounting the beam anchor 100 includes moving the beam anchor 100 upwardly (e.g., with one hand) until the flange 432 passes through the jaw gap 140 as shown in FIG. 12, followed by moving the beam anchor 100 laterally (e.g., in a sideways direction), and resting the jaw portion 130 of the second arm assembly 122 on the flange 432, as shown in FIG. 13.

Step 508 of the method 500 includes pivoting the torque arm 124 of the first arm assembly 120 from the open position 144 (FIG. 13) to the closed position 142 as shown in FIG. 14. With the weight of the beam anchor 100 supported by the jaw portion 130 of the second arm assembly 122 resting on the flange 432 of the beam 426, the torque arm 124 on the first arm assembly 120 can be manually pivoted into the closed position 142 using one hand.

Figure 15:
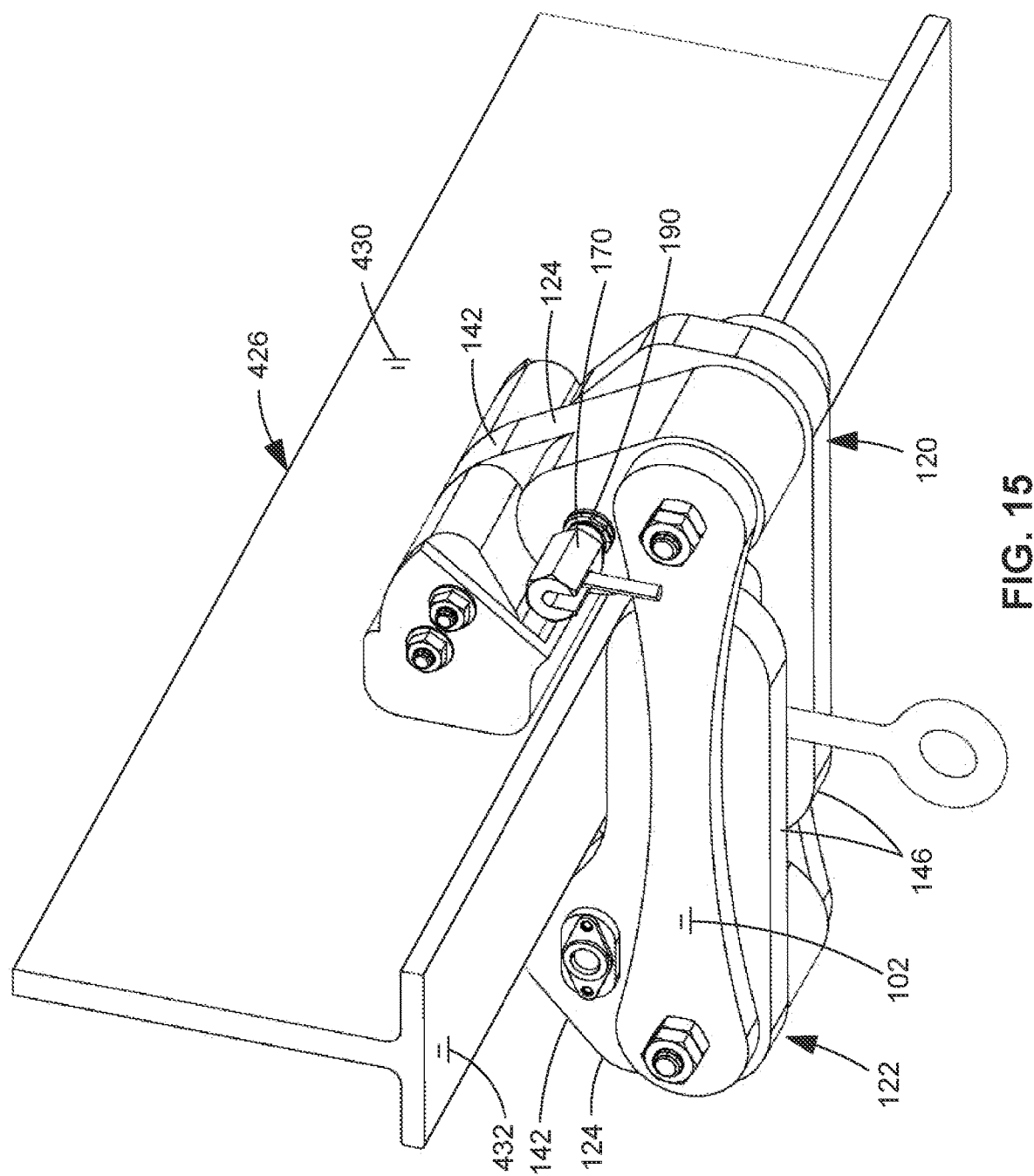
FIG. 15 is a bottom-up perspective view of the beam anchor mounted to the beam.
Figure 16:
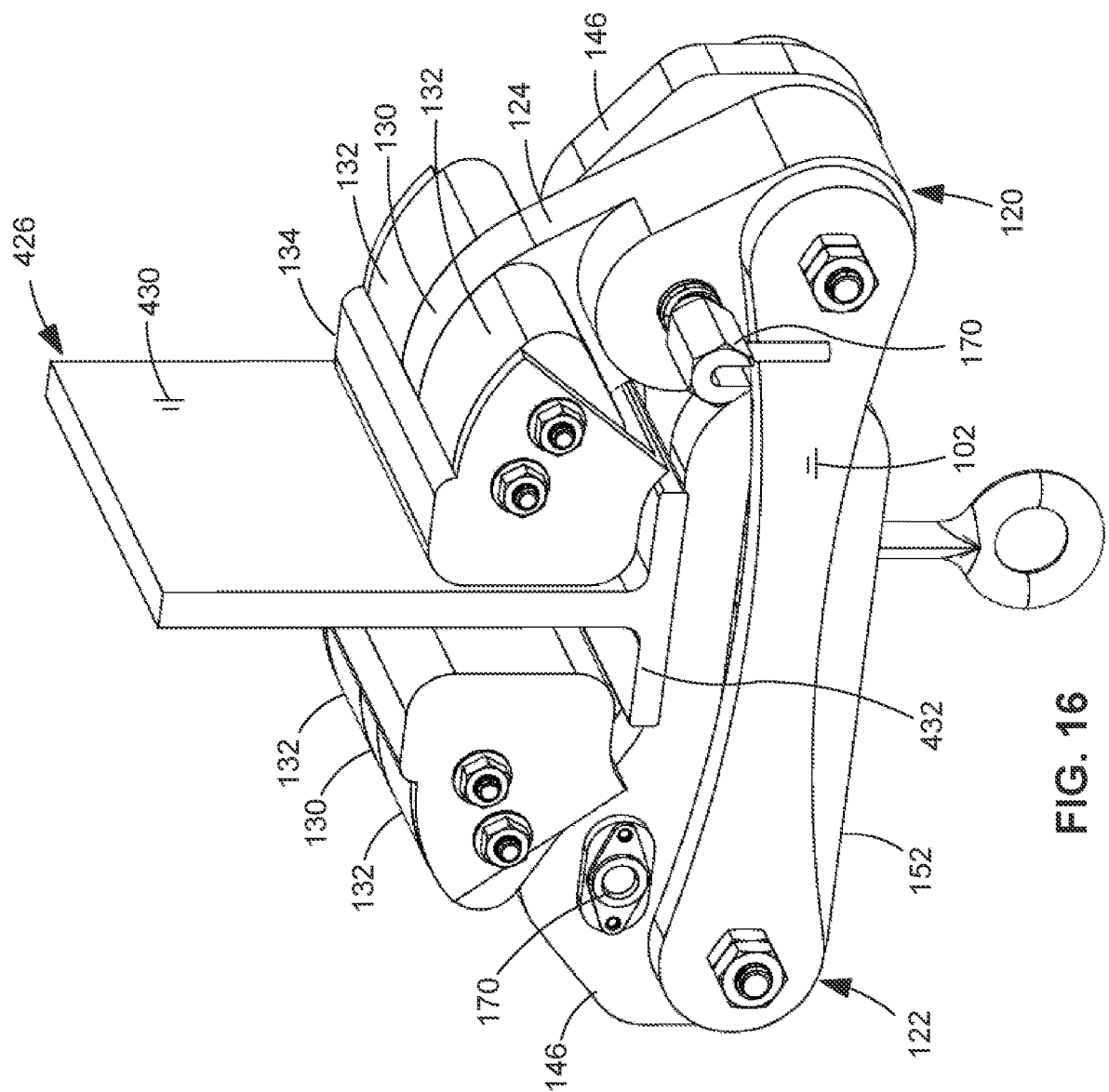
FIG. 16 is a top-down perspective view of the beam anchor mounted to the beam.

After pivoting the torque arm 124 of the first arm assembly 120 into the closed position 142, step 510 of the method 500 includes locking the torque arm 124 of the first arm assembly 120 in the closed position 142, which can also be performed using one hand. For the above-described example in which the locking mechanism 170 of the first arm assembly 120 comprises the locking pin 172, step 510 comprises axially sliding the locking pin 172 of the torque arm 124 into the pin bore 128 (e.g., the pin receptacle 188) in the slotted arm 146, thereby moving the locking pin 172 from the unlocked position 192 (FIG. 5) to the locked position 190 (FIG. 4), and locking the torque arm 124 in the closed position 142. For some examples of the locking mechanism 170, the method includes biasing the locking pin 172 toward the locked position 190, such that when the locking pin 172 is aligned with the pin bore 128 in the slotted arm 146, the locking pin 172 is automatically urged into the pin bore 128. In the above-described example, the locking mechanism 170 includes the coil spring 184 (FIGS. 4-5), and the locking pin 172 can be moved to the locked position 190 by rotating the pin handle 176 until aligned with the pin slot 186, after which the coil spring 184 urges the locking pin 172 into the pin bore 128 when aligned with the locking pin 172. FIGS. 15-16 show the beam anchor 100 mounted to the beam 426, with both locking mechanisms 170 in the locked position 190.

The method 500 further includes applying a load 300 to the connector pin 206 in a manner causing the slotted arms 146 to pivot away from each other as the connector pin 206 slides along the arm slots 154, and the torque arms 124 pivot toward each other until the jaw portions 130 engage the web 430 of the beam 426, as shown in FIGS. 20-21. In FIGS. 17-19, the step of applying a load 300 to the connector pin 206 can result from a load 300 applied to the loading mechanism 200. In the example shown, the step of applying the load 300 to the connector pin 206 comprises applying a tensile load to a loading member 202, which is coupled to the connector pin 206 as shown in FIG. 3 and described above. In the example shown, the loading member 202 is an eye bolt 204 that extends out of the slotted arm gap 156 between the slotted arms 146 as shown in FIG. 19. The step of applying the tensile load to the loading member 202 comprises attaching a safety net 400 or a safety tether (not shown) to the loading member 202, and subjecting the safety net or safety tether to a load 300 (e.g., due to a falling object or person).

The method 500 further includes distributing, via a pair of jaw blocks 132 on opposite sides of the jaw portions 130 of the first and second arm assemblies 120, 122, forces on the web 430 when clamping the web 430 between the jaw portions 130 of the first and second arm assemblies 120, 122. As described above and shown in FIG. 21, the jaw portions 130 apply a clamping force 302 on the web 430 when a load 300 (e.g., a downward load) is applied to the connector pin 206 via the loading member 202 (e.g., the eye bolt 204). The jaw blocks 132 distribute the clamping force 302 on the web 430 and thereby prevent potential damage that may otherwise occur due to concentrated clamping forces applied by the jaw portions 130 alone.

Further in this regard, the method 500 includes protecting the beam 426 with jaw pads 134 covering the jaw blocks 132 and jaw portions 130 of the first and second arm assemblies 120, 122 against damage from the jaw portions 130 when engaging the beam 426 and apply clamping force 302 to the web 430. As described above, the first and second arm assemblies 120, 122 can each include a jaw pad 134 covering the jaw portion 130 and jaw blocks 132, and which can be formed of a material that is softer than the beam 426, to thereby prevent damage to the beam 426.

The method 500 can further include removing the beam anchor 100 from the beam 426 by unlocking the torque arm 124 of the first arm assembly 120 (e.g., using one hand), and pivoting the torque arm 124 (e.g., using one hand) into the open position 144. With the torque arm 124 in the open position 144, the method includes removing the beam anchor 100 from the beam 426 by moving the beam anchor 100 downwardly (e.g., using one hand) until the flange 432 of the beam 426 passes through the jaw gap 140 between the opposing jaw portions 130 of the beam anchor 100. The process of removing the beam anchor 100 from the beam 426 is a reversal of the above-described process of installing the beam anchor 100.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A beam anchor for mounting on a beam having a web and a flange oriented perpendicular to the web, the beam anchor comprising:
   a pair of braces positionable in parallel relation to each other;
   a first arm assembly and a second arm assembly, each comprising a torque arm having a jaw portion, and a slotted arm having a slotted portion containing an arm slot, and the first and second arm assemblies are positionable between the braces such that:
   the jaw portions oppose each other;
   the slotted portions are side-by-side;
   the torque arm and the slotted arm of the first and second arm assemblies are coupled to the braces respectively at a pair of pivot joints on opposite sides of the beam anchor;
   a locking mechanism, movable between a locked position in which the torque arm of one of the first or second arm assemblies is locked to the slotted arm of the same one of the first or second arm assemblies, and an unlocked position in which the torque arm is freely pivotable relative to the slotted arm;
   a connector pin configured to extend into both of the arm slots; and
   wherein the beam anchor is configured such that when mounted on the beam and with the locking mechanism in the locked position, a load applied to the connector pin causes the slotted arms to pivot away from each other as the connector pin slides along the arm slots, and the torque arms pivot toward each other until the jaw portions engage the web of the beam.

2. The beam anchor of claim 1, wherein:
the slotted portions are spaced apart to define a slotted arm gap;
the connector pin is coupled to a loading member extending out of the slotted arm gap; and
the load on the connector pin results from a tensile load on the loading member.

3. The beam anchor of claim 1, wherein:
the locking mechanism comprises a locking pin insertable into a pin bore in one of the torque arm or the slotted arm, and the locking pin is axially movable between the locked position and the unlocked position.

4. The beam anchor of claim 3, wherein:
the locking pin is biased toward the locked position, such that when the locking pin is aligned with the pin bore, the locking pin is urged into the pin bore, thereby locking the torque arm to the slotted arm.

5. The beam anchor of claim 1, wherein:
the first and second arm assemblies each have a dedicated locking mechanism for locking and unlocking pivoting motion of the respective torque arm relative to the respective slotted arm.

6. The beam anchor of claim 1, wherein:
each torque arm has a pair of jaw blocks on opposite sides of the jaw portion, for distributing forces applied to the web of the beam.

7. The beam anchor of claim 6, wherein:
the first and second arm assemblies each include a jaw pad covering the jaw portion and extending across the jaw blocks.

8. The beam anchor of claim 7, wherein:
each jaw pad has a web-bearing face and a flange-bearing face configured to respectively bear against the web and the flange of the beam.

9. The beam anchor of claim 1, wherein:
the first and second arm assemblies are identical in size and shape.

10. A fall protection system, comprising:
one or more beam anchors, each configured for clamping onto a beam having a web and a flange perpendicular to the web, each beam anchor comprising:

a pair of braces, positionable in parallel relation to each other;

a pair of arm assemblies, each comprising a torque arm having a jaw portion, and a slotted arm having a slotted portion containing an arm slot, and positionable between the braces such that:
 the jaw portions oppose each other;
 the slotted portions are side-by-side;
 the torque arm and the slotted arm of the pair of arm assemblies are coupled to the braces respectively at a pair of pivot joints on opposite sides of the beam anchor;

at least one locking mechanism, movable between a locked position in which the torque arm of one of the arm assemblies is non-pivotably locked to the slotted arm of the same one of the arm assemblies, and an unlocked position in which the torque arm is freely pivotable;

a connector pin, configured to extend into both of the arm slots;

a safety net attached to the one or more beam anchors; and wherein each beam anchor is configured such that when mounted on a beam and with the locking mechanism in the locked position, a load on the safety net is transferred to the connector pin, causing the slotted arms to pivot away from each other as the connector pin slides along the arm slots, and causing the torque arms to pivot toward each other until the jaw portions engage the web of the beam.

11. A method of installing a beam anchor on a beam having a web and a flange perpendicular to the web, comprising:

providing a beam anchor, comprising:
 a pair of braces parallel to each other;
 a first arm assembly and a second arm assembly, each comprising a torque arm having a jaw portion, and a slotted arm having a slotted portion containing an arm slot, the first and second arm assemblies are positioned between the braces such that:
  the jaw portions oppose each other;
  the slotted portions are side-by-side;
  the torque arm and the slotted arm of the first and second arm assemblies are coupled to the braces respectively at a pair of pivot joints on opposite sides of the beam anchor;
 a connector pin extending into both of the arm slots;

pivoting the torque arm of the first arm assembly into an open position that provides a jaw gap between the jaw portions that is at least as wide as the flange of the beam;

mounting the beam anchor on the beam by moving the beam anchor such that the flange passes through the jaw gap, and resting the jaw portion of the second arm assembly on the flange;

pivoting the torque arm of the first arm assembly into a closed position that provides a jaw gap that is narrower that the flange of the beam; and locking the torque arm of the first arm assembly in the closed position.

12. The method of claim 11, further comprising:

applying a load to the connector pin in a manner causing the slotted arms to pivot away from each other as the connector pin slides along the arm slots, and the torque arms pivot toward each other until the jaw portions engage the web of the beam.

13. The method of claim 12, wherein applying a load to the connector pin comprises:

applying a tensile load to a loading member coupled to the connector pin and extending out of a slotted arm gap between the slotted arms.

14. The method of claim 13, wherein applying a tensile load to the loading member comprises:

applying the load to a safety net or a safety tether attached to the loading member.

15. The method of claim 12, further comprising:

distributing, via a pair of jaw blocks on opposite sides of the jaw portions of each of the first and second arm assemblies, clamping forces on the web when the jaw portions engage the web as a result of the load on the connector pin.

16. The method of claim 15, further comprising:

protecting the beam with jaw pads covering the jaw blocks and jaw portions respectively of the first and second arm assemblies.

17. The method of claim 11, wherein locking the torque arm in the closed position comprises:

axially sliding a locking pin of one of the torque arm or the slotted arm of the first arm assembly, into a pin bore formed in a remaining one of the torque arm or the slotted arm of the first arm assembly.

18. The method of claim 17, further comprising:

biasing the locking pin toward the locked position, such that when the locking pin is aligned with the pin bore, the locking pin is urged into the pin bore.

19. The method of claim 11, further comprising removing the beam anchor by performing the following:

unlocking the torque arm of the first arm assembly;

pivoting the torque arm of the first arm assembly into the open position; and removing the beam anchor from the beam by moving the beam anchor such that the flange of the beam passes through the jaw gap.

20. The method of claim 11, wherein mounting the beam anchor on the beam comprises:

mounting the beam anchor on a floor beam.

\* \* \* \* \*